United States Patent
Mansfield et al.

(10) Patent No.: US 9,702,022 B2
(45) Date of Patent: Jul. 11, 2017

(54) PROCESS AND SYSTEM FOR DE-COATING OF ALUMINUM SCRAP CONTAMINATED WITH ORGANIC COATINGS

(71) Applicant: Industrial Furnace Company, Rochester, NY (US)

(72) Inventors: William A. Mansfield, Webster, NY (US); Donald Whipple, Williamsville, NY (US)

(73) Assignee: Industrial Furnace Company, Rochester, NY (US)

( * ) Notice: Subject to any disclaimer, the term of this patent is extended or adjusted under 35 U.S.C. 154(b) by 165 days.

(21) Appl. No.: 14/826,036

(22) Filed: Aug. 13, 2015

(65) Prior Publication Data

US 2016/0047013 A1 Feb. 18, 2016

Related U.S. Application Data

(60) Provisional application No. 62/133,052, filed on Mar. 13, 2015, provisional application No. 62/036,725, filed on Aug. 13, 2014.

(51) Int. Cl.
*B08B 7/00* (2006.01)
*C22B 21/00* (2006.01)
(Continued)

(52) U.S. Cl.
CPC .......... *C22B 21/0007* (2013.01); *C22B 1/005* (2013.01); *F27B 1/005* (2013.01); *F27B 3/04* (2013.01); *Y02P 10/212* (2015.11)

(58) Field of Classification Search
CPC ... C22B 21/0007; C22B 1/005; B09B 3/0083; F27B 3/04; F27B 1/005; Y02P 10/212
See application file for complete search history.

(56) References Cited

U.S. PATENT DOCUMENTS 3,650,830 A * 3/1972 Mathis ............... C22B 21/0069
134/25.1
4,554,088 A 11/1985 Whitehead
(Continued)

*Primary Examiner* — Binh X Tran
*Assistant Examiner* — David Cathey, Jr.
(74) *Attorney, Agent, or Firm* — Nixon Peabody LLP

(57) ABSTRACT

A method for removal of organic coatings from loose aluminum scrap includes passing the scrap through a Multiple Hearth Furnace operatively maintained in the range of 500° F.-1600° F. Each hearth in the furnace is independently temperature controlled and held under a slightly negative pressure environment. The hearths heat the scrap such that pyrolysis of the coatings occurs within the hearth. Organic compounds liberated during this process are partially or entirely consumed within the furnace combustion products are exhausted through the top. Hydrogen fluoride contained in the products of combustion is incinerated prior to final discharge from the system and routing to additional environmental equipment for particle removal. Scrap is continuously fed into the top of the furnace, and agitated and mechanically moved within each hearth toward an output of another hearth therebelow. The agitation and movement of the scrap exposes the scrap to the hearth atmosphere to assist in processing of the scrap. The discharge of the scrap in the final hearth supplies hot (250° F.-900° F.), clean material for the next step in the process for secondary aluminum recycling.

14 Claims, 26 Drawing Sheets
(18 of 26 Drawing Sheet(s) Filed in Color)

(51) Int. Cl.
*C22B 1/00* (2006.01)
*F27B 1/00* (2006.01)
*F27B 3/04* (2006.01)

(56) References Cited

U.S. PATENT DOCUMENTS

| | | |
|---|---|---|
| 4,654,088 A | 3/1987 | Fitzpatrick |
| 5,405,428 A | 4/1995 | Dube |
| 6,227,847 B1 | 5/2001 | Gillespie |
| 7,735,434 B2 | 6/2010 | Lonardi |
| 8,163,062 B2 | 4/2012 | Niehoff |
| 8,382,471 B2 | 2/2013 | Lonardi |
| 2013/0199338 A1* | 8/2013 | Chalabi .................. C22B 1/005 75/687 |

* cited by examiner

Drying Zone Summary

| | | Inlet | | | | | Outlet | | |
|---|---|---|---|---|---|---|---|---|---|
| | Lb/Hr | Sensible + Latent Heat BTU/lb | Heat of Combustion BTU/lb | Total BTU/Hr | | Lb/Hr | BTU/lb | BTU/Hr |
| Aluminum | 18,228 | 0 | 0 | 0 | Aluminum | 18,228 | 33 | 595,691 |
| Volatiles | 1,098 | 0 | 10,608 | 11,643,042 | Volatiles | 1,098 | 46 | 10,608 / 11,693,092 |
| Fixed Carbon | 110 | 0 | 14,544 | 1,596,349 | Fixed Carbon | 110 | 46 / 14,544 | 1,601,354 |
| Ash | 69 | 0 | 0 | 0 | Ash | 69 | 46 | 3,126 |
| Moisture | 400 | 0 | 0 | 0 | Moisture | 0 | 0 | 0 |
| Auxiliary Fuel Used | 0 | 0 | 23,331 | 0 | | | | |
| Ambient Air Injection | | | | | | | | |
| Cool Air N₂ | 1,182 | 0 | 0 | 0 | | | | |
| Cool Air O₂ | 357 | 0 | 0 | 0 | | | | |
| Gas from Heating | | | | | From Process | | | |
| H₂O | 404 | 1,535 | 0 | 619,732 | H₂O | 938 | 1,528 | 1,431,360 |
| CO₂ | 1,635 | 245 | 0 | 400,414 | CO₂ | 2,045 | 186 | 380,784 |
| SO₂ | 0 | 186 | 0 | 0 | SO₂ | 0 | 142 | 0 |
| N₂ | 4,530 | 255 | 0 | 1,155,637 | N₂ | 5,712 | 198 | 1,132,957 |
| O₂ | 0 | 234 | 0 | 0 | O₂ | 0 | 181 | 0 |
| Volatiles | 537 | 597 | 10,608 | 6,013,525 | Volatiles | 350 | 533 | 3,904,207 |
| Shell Heat Losses | | | | | | | | 64,133 |
| Shaft Air Losses | | | | | | | | 621,993 |
| Totals | 28,549 | | | 21,428,700 | | 28,549 | | 21,428,700 |
| Mass Bal. Check | 0 | | | | | | | |
| Energy Bal. Check | 0 | | | | | | | |

FIG. 4B

Heating Zone Summary

| | | Inlet | | | | | Outlet | | |
|---|---|---|---|---|---|---|---|---|---|
| | Lb/Hr | Sensible + Latent Heat BTU/Lb | Heat of Combustion BTU/Lb | Total BTU/Hr | | Lb/Hr | BTU/Lb | BTU/Hr |
| Aluminum | 18,228 | 33 | 0 | 595,691 | Aluminum | 18,228 | 62 | 1,138,516 |
| Volatiles | 1,098 | 46 | 10,608 | 11,693,092 | Volatiles | 1,098 | 87 | 11,736,533 |
| Fixed Carbon | 110 | 46 | 14,544 | 1,601,354 | Fixed Carbon | 110 | 87 | 1,605,899 |
| Ash | 69 | 46 | 0 | 3,128 | Ash | 69 | 87 | 5,968 |
| Moisture | 0 | 0 | 0 | 0 | Moisture | 0 | 0 | 0 |
| Auxiliary Fuel Used | 0 | 387 | 10,608 | 0 | | | | |
| Ambient Air Injection | | | | | | | | |
| Cool Air N₂ | 1,385 | 0 | 0 | 0 | | | | |
| Cool Air O₂ | 418 | 0 | 0 | 0 | | | | |
| Gas From Devol | | | | | From Process | | | |
| H₂O | 247 | 1,723 | 0 | 424,970 | H₂O | 404 | 1,703 | 687,556 |
| CO₂ | 1,156 | 347 | 0 | 400,933 | CO₂ | 1,635 | 245 | 400,414 |
| SO₂ | 0 | 282 | 0 | 0 | SO₂ | 0 | 166 | 0 |
| N₂ | 3,145 | 351 | 0 | 1,104,847 | N₂ | 4,530 | 255 | 1,155,637 |
| O₂ | 0 | 323 | 0 | 0 | O₂ | 0 | 234 | 0 |
| Volatiles | 755 | 702 | 10,608 | 8,537,181 | Volatiles | 537 | 587 | 6,013,525 |
| Shell Heat Losses | | | | | | | | 110,928 |
| Shaft Air Losses | | | | | | | | 1,506,221 |
| Totals | 26,609 | | | 24,361,197 | Totals | 26,609 | | 24,361,197 |
| Mass Bal Check: | 0 | | | | | | | |
| Energy Bal Check: | 0 | | | | | | | |

FIG. 5B

De-Volatilizing Zone Summary

| | | Inlet | | | | | Outlet | | |
|---|---|---|---|---|---|---|---|---|---|
| | | Sensible + Latent Heat | Heat of Combustion | Total | | | | | |
| | Lb/Hr | BTU/Lb | BTU/Lb | BTU/Hr | | | Lb/Hr | BTU/Lb | BTU/Hr |
| Aluminum | 18,228 | 62 | 0 | 1,136,516 | Aluminum | | 18,228 | 170 | 3,096,026 |
| Volatiles | 1,098 | 87 | 10,608 | 11,738,533 | Volatiles | | 0 | 237 | 0 |
| Fixed Carbon | 110 | 87 | 14,544 | 1,605,899 | Fixed Carbon | | 110 | 237 | 1,622,363 |
| Ash | 69 | 87 | 0 | 5,968 | Ash | | 69 | 237 | 16,258 |
| Moisture | 0 | 0 | 0 | 0 | Moisture | | 0 | 0 | 0 |
| Auxiliary Fuel Used | 0 | 0 | 23,331 | 0 | | | | | |
| Ambient Air Injection | | | | | | | | | |
| Cool Air N₂ | 0 | 0 | 0 | 0 | | | | | |
| Cool Air O₂ | 0 | 0 | 0 | 0 | | | | | |
| Gas from De-Char | | | | | From Process | | | | |
| H₂O | 0 | 1,623 | 0 | 0 | | H₂O | 247 | 1,631 | 402,483 |
| CO₂ | 402 | 292 | 0 | 117,695 | | CO₂ | 1,156 | 347 | 400,933 |
| SO₂ | 0 | 222 | 0 | 0 | | SO₂ | 0 | 262 | 0 |
| N₂ | 3,145 | 300 | 0 | 944,346 | | N₂ | 3,145 | 351 | 1,104,847 |
| O₂ | 657 | 276 | 0 | 181,345 | | O₂ | 0 | 323 | 0 |
| Volatiles | 0 | 647 | 10,608 | 0 | Volatiles | | 755 | 702 | 8,537,181 |
| Shell Heat Losses | | | | | | | | | 38,528 |
| Shaft Air Losses | | | | | | | | | 511,683 |
| Totals | 23,708 | | | 15,730,301 | | | 23,708 | | 15,730,301 |
| Mass Bal. Check: | 0 | | | | | | | | |
| Energy Bal. Check: | 0 | | | | | | | | |

FIG. 6B

De-Charring Zone Summary

| | | Inlet | | | | Outlet | | |
|---|---|---|---|---|---|---|---|---|
| | | Sensible + Latent Heat | Heat of Combustion | | Total | | | |
| | Lb/Hr | BTU/Lb | BTU/Lb | BTU/Hr | BTU/Hr | Lb/Hr | BTU/Lb | BTU/Hr |
| Aluminum | 18,228 | 170 | 0 | | 3,096,026 | 18,228 | 181 | 3,291,977 |
| Volatiles | 0 | 237 | 10,608 | | 0 | 0 | 252 | 0 |
| Fixed Carbon | 110 | 237 | 14,544 | | 1,622,383 | 0 | 252 | 0 |
| Ash | 69 | 237 | 0 | | 16,258 | 69 | 252 | 17,287 |
| Moisture | 0 | 0 | | | 0 | 0 | 0 | 0 |
| Auxiliary Fuel Used | 0 | | 23,331 | | 0 | | | |
| Ambient Air Injection | | | | | | | | |
| Cool Air N₂ | 3,145 | | | | | | | |
| Cool Air O₂ | 850 | | | | | | | |
| Gas from Discharge | | | | | | Gas Out to Devol | | |
| H₂O | 0 | 1,060 | 0 | | 0 | 0 | 1,060 | 0 |
| CO₂ | 0 | 0 | 0 | | 0 | 402 | 292 | 117,695 |
| SO₂ | 0 | 0 | 0 | | 0 | 0 | 222 | 0 |
| N₂ | 0 | 0 | 0 | | 0 | 3,145 | 300 | 944,346 |
| O₂ | 0 | 0 | 0 | | 0 | 657 | 276 | 0 |
| Volatiles | 0 | 300 | 10,608 | | 0 | 0 | 647 | 10,608 |
| Shell Heat Losses | | | | | | | | 69,810 |
| Shaft Air Losses | | | | | | | | 293,532 |
| Totals | 22,501 | | | | 4,734,647 | 22,501 | | 4,734,647 |
| Mass Bal. Check | 0 | | | | | | | |
| Energy Bal. Check | 0 | | | | | | | |

FIG. 7B

Afterburner Summary

| Temperature | 838 | Sensible + Latent Heat | Heat of Combustion | | 1,600 | | Outlet | |
|---|---|---|---|---|---|---|---|---|
| | Lb/Hr | BTU/Lb | BTU/Lb | Total BTU/Hr | Lb/Hr | BTU/Lb | BTU/Hr | |
| Aluminum | 0 | 0 | 0 | 0 | 0 | 0 | 0 | |
| Volatiles | 0 | 0 | 10,608 | 0 | 0 | 42 | 10,608 | 0 |
| Fixed Carbon | 0 | 0 | 14,544 | 0 | 0 | 42 | 14,544 | 0 |
| Ash | 0 | 0 | 0 | 0 | 0 | 42 | 0 | 0 |
| Moisture | 0 | 0 | 0 | 0 | 0 | | | 0 |
| Vaporized Volatiles | 350 | 533 | 10,608 | 3,904,207 | 0 | 533 | 10,608 | 0 |
| Hot Shaft Cooling Air | | | | | | | | |
| Hot Air N$_2$ | 4,832 | 85 | 0 | 409,373 | | | | |
| Hot Air O$_2$ | 1,460 | 76 | 0 | 111,324 | | | | |
| Fuel | 44 | 0 | 23,331 | 1,018,024 | | | | |
| Ambient Air Injection | 0 | | | | | | | |
| Cool Ambient Air N$_2$ | 0 | | | | | | | |
| Cool Ambient Air O$_2$ | 0 | | | | | | | |
| Gas from Drying | | | | | | | | |
| H$_2$O | 938 | 1,426 | 0 | 1,337,666 | 1,287 | 1,834 | 0 | 2,360,982 |
| CO$_2$ | 2,045 | 186 | 0 | 380,784 | 2,933 | 407 | 0 | 1,195,226 |
| SO$_2$ | 0 | 142 | 0 | 0 | 0 | 306 | 0 | 0 |
| N$_2$ | 5,712 | 198 | 0 | 1,132,957 | 10,545 | 408 | 0 | 4,298,720 |
| O$_2$ | 0 | 181 | 0 | 0 | 615 | 376 | 0 | 231,183 |
| Shell Heat Losses | | | | | | | | 208,224 |
| Shaft Air Losses | | | | | | | | 0 |
| Totals | 15,380 | | | 8,294,335 | 15,380 | | | 8,294,335 |
| Mass Bal. Check: | 0 | | | | | | | |
| Energy Bal. Check: | 0 | | | | | | | |

FIG. 8B

| Material | Current Recovery Rate | MHF Recovery Rate | Percent Increase |
|---|---|---|---|
| Painted Siding | 87.1 | 94.5 | 8.5% |
| Laminated Foil | 59 | 83.8 | 42.0% |
| UBC | 76.6 | 97.8 | 27.7% |
| Lotion Bottles | 84.6 | 95 | 12.3% |
| Transformer Wire | 87 | 97.5 | 12.1% |
| Blue Laminated Foil | 64.4 | 82.3 | 27.8% |

PROCESS AND SYSTEM FOR DE-COATING OF ALUMINUM SCRAP CONTAMINATED WITH ORGANIC COATINGS

CROSS REFERENCE TO RELATED APPLICATIONS

This application claims the benefit of U.S. Provisional Patent Application No. 62/133,052, filed Mar. 13, 2015, entitled "Aluminum Recycling System and Method" and U.S. Provisional Application No. 62/036,725 filed Aug. 13, 2014, entitled "Aluminum Recycling System and Method," both of which are hereby incorporated by reference in their entirety.

FIELD OF THE INVENTION

The present invention relates generally to recycling of scrap materials.

BACKGROUND OF THE INVENTION

Post-consumer aluminum scrap processing allows the aluminum metal to be recovered and returned to re-create the original consumer products. Recovery rates are extremely important as the losses must be replaced with primary metal which has a specific energy rate of ten times the specific energy rate for recycled metal. The original consumer products have a variety of specialized coatings (e.g., coatings on interior surfaces of cans to protect the aluminum from reacting with liquids borne by the cans, thermoplastic or thermoset coatings on exteriors of cans, etc.) which remain intact on the scrap and must be removed prior to melting of the aluminum metal. Failure to completely remove the coatings prior to melting the scrap results in metal loss (12-13%) from an uncontrolled thermite reaction and dross generation.

When aluminum scrap is returned to be recycled, it is usually contaminated with volatile organic coatings (VOCs). There are many different types of aluminum scrap, originating from manufacturing processes or consumers. Post-consumer waste comes in many different forms, but is generally grouped into three categories, which are defined by their VOCs as a percentage of weight: Low (<5% by weight), Medium (5%-25% by weight) and High (25%+ by weight). These coatings vary in composition, but can comprise, for example, one or more of oil, scrap, lacquer and/or plastic, amongst other materials. All of these coatings must be removed before sending the aluminum to the melting furnace(s) for further recycling processing. Conventionally, removal of the VOCs from used beverage containers (UBC) and other kind of scrap is primarily accomplished using rotary kilns or single-chamber batch (charge) furnaces.

Well-known methods for addressing VOCs in aluminum scrap are set forth in the following patents. U.S. Pat. No. 4,654,088, titled "Decoating of aluminum scrap," sets forth a method of removing organic coatings from scrap aluminum by using a gas-permeable conveyor to pass scrap metal through a pyrolysis zone where an oxygen-containing hot gas is directed downwardly through the scrap metal, the hot gas being at a temperature to raise the upper surface of the scrap to a temperature in the range of 500°-600° C., with the temperature and rate of supply and oxygen content of such gas and the rate of travel of the scrap being adjusted to ensure that a reaction front at which the organic material is pyrolyzed and residual carbon is burned travels from top to bottom of the bed within the pyrolysis zone and to allow the scrap to be retained within the pyrolysis zone for up to 10 minutes after the reaction front reaches the bottom of the scrap.

U.S. Pat. No. 5,405,428, titled "Decontamination and/or surface treatment of metals," relates to a process of decontaminating metal (e.g., aluminum or aluminum alloy) scrap contaminated with organic material, the process involving heating the scrap in a fluidized bed of solid particles fluidized by a fluidizing gas to a decontaminating temperature high enough to consume the organic material but below the melting point of the metal. The heating step is carried out in the presence of a protective material which protects the aluminum or aluminum alloy against substantial oxidation while the scrap is held in the bed at the decontaminating temperature. U.S. Pat. No. 6,227,847, titled "Apparatus and process for removing volatile coatings from scrap metal," sets forth a system for removing volatile coatings from scrap aluminum including a kiln, a fan for generating an airstream, an afterburner for heating the airstream, and ducting for confining the airstream in a closed loop so that it circulates through the afterburner, the kiln and back to the fan in that order. The ducting includes a bypass duct into which a portion of the airstream is diverted at a diverter value, before being heated by the afterburner. This portion reenters the heated portion of the airstream downstream from the afterburner and serves to modulate the temperature of the airstream entering the kiln. The temperature where the airstream enters the kiln is maintained at a temperature hot enough to volatilize coatings on the aluminum, yet not hot enough to melt the aluminum. As it passes through the kiln, the airstream possesses a diminished oxygen content, so that the volatilized coating does not ignite. The fan responds to another temperature sensor located where the airstream leaves the kiln such as to vary the mass flow, so that the temperature of the airstream leaving the kiln likewise remains constant. A collector exists in the ducting, between the kiln and the fan, and should its surfaces become cool enough to condense the volatilized coatings on them, the system recirculates some of the heated airstream to the collector to maintain the airstream entering it above a prescribed temperature.

By way of example, one conventional process to remove organic materials (see, e.g., U.S. Pat. No. 6,227,847, supra) utilizes an IDEX® chip dryer, shown in FIG. 1, comprising a rotary kiln to heat the scrap material to remove the organic materials through volatilization, using high temperature, low $O_2$ gas, and an afterburner chamber in which the liberated organics are subjected to controlled incineration.

Common problems exist with the above methods such as, but not limited to, high energy intensity for the treatment process, incomplete removal of coatings, oxidation of the scrap metal surfaces, and environmental impact of further treatment required to clean the metal.

SUMMARY OF THE INVENTION

In accordance with aspects of the present disclosure, a method for de-coating aluminum-containing scrap comprising organic compounds comprises the act of inputting the aluminum-containing scrap into a multiple hearth furnace comprising a plurality of hearths, the plurality of hearths collectively defining, sequentially, a drying zone, a heating zone, a de-volatizing zone, and a de-charring zone, with each of the drying zone, heating zone, de-volatizing zone, and de-charring zone comprising one or more hearths and with each of the plurality of hearths comprising at least one agitation device to move the aluminum-containing scrap within the hearth and to a successive hearth. The method further includes the act of maintaining temperatures within at least some of the plurality of hearths between about 500° F. and 1600° F. and agitating the aluminum-containing scrap to induce pyrolysis of the organics and to de-coat the aluminum-containing scrap while maintaining the aluminum-containing scrap temperature below about 1110° F. to avoid melting of the aluminum. The method further includes the act of outputting the de-coated aluminum-containing scrap from the multiple hearth furnace.

In another aspect of the present concepts, a method for recycling aluminum-containing scrap comprising at least one coating material and comprising organic contaminants, comprises the act of inputting the aluminum-containing scrap into a multiple hearth furnace comprising a plurality of hearths, the plurality of hearths collectively defining, sequentially, a drying zone, a heating zone, a de-volatizing zone, and a de-charring zone, with each of the drying zone, heating zone, de-volatizing zone, and de-charring zone comprising one or more hearths and with each of the plurality of hearths comprising at least one agitation device to move the aluminum-containing scrap within the hearth and to a successive hearth. The method also include the acts of maintaining a temperature of the one or more hearths comprising the drying zone between about 500° F.-1100° F. and agitating the aluminum-containing scrap within the drying zone, maintaining a temperature of the one or more hearths comprising the heating zone between about 900° F.-1400° F. and agitating the aluminum-containing scrap within the heating zone, maintaining a temperature of the one or more hearths comprising the de-volatilizing zone between about 900° F.-1600° F. and agitating the aluminum-containing scrap within the de-volatilizing zone, and maintaining a temperature of the one or more hearths comprising the de-charring zone between about 700° F.-1250° F. and agitating the aluminum-containing scrap within the de-charring zone. The method also include the act of outputting the de-coated aluminum-containing scrap from the multiple hearth furnace to a post-processing system adapted to further process the de-coated aluminum-containing scrap. During this method, a temperature of the aluminum-containing scrap in the multiple hearth furnace is maintained below about 1100° F. to avoid melting of the aluminum.

In yet another aspect of the present concepts, a multiple hearth furnace system is configured to de-coat aluminum-containing scrap comprising at least one coating material and comprising organic contaminants. The multiple hearth furnace system comprises a plurality of hearths sequentially defining a drying zone, a heating zone, a de-volatizing zone, and a de-charring zone, each of the drying zone, heating zone, de-volatizing zone, and de-charring zone comprising one or more hearths. In this multiple hearth furnace, at least one agitation device is disposed within each of the plurality of hearths to move the aluminum-containing scrap within the hearth and to a successive hearth. The multiple hearth furnace system further comprises an instrumentation and control system configured to monitor each zone and to maintain a temperature of the one or more hearths comprising the drying zone between about 500° F.-1100° F., maintain a temperature of the one or more hearths comprising the heating zone between about 900° F.-1400° F., maintain a temperature of the one or more hearths comprising the de-volatilizing zone between about 900° F.-1600° F., and maintain a temperature of the one or more hearths comprising the de-charring zone between about 700° F.-1250° F., while further maintaining each of the plurality of zones at a slightly negative pressure.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, which are considered to be inventive singly or in any combination, will be readily apparent from the following detailed description of representative embodiments and modes for carrying out the present invention when taken in connection with the accompanying drawings and the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 4A-4B show a mass and energy balance summary for a drying zone, using the MHF of FIGS. 2A-2F, in accord with at least some aspects of the present concepts.

FIGS. 5A-5B show a mass and energy balance summary for a heating zone, using the MHF of FIGS. 2A-2F, in accord with at least some aspects of the present concepts.

FIGS. 6A-6B show a mass and energy balance summary for a devolatizing zone, using the MHF of FIGS. 2A-2F, in accord with at least some aspects of the present concepts.

FIGS. 7A-7B show a mass and energy balance summary for a decharring zone, using the MHF of FIGS. 2A-2F, in accord with at least some aspects of the present concepts.

FIGS. 8A-8B show a mass and energy balance summary for an afterburner zone, using the MHF of FIGS. 2A-2F, in accord with at least some aspects of the present concepts.

Figure 1:
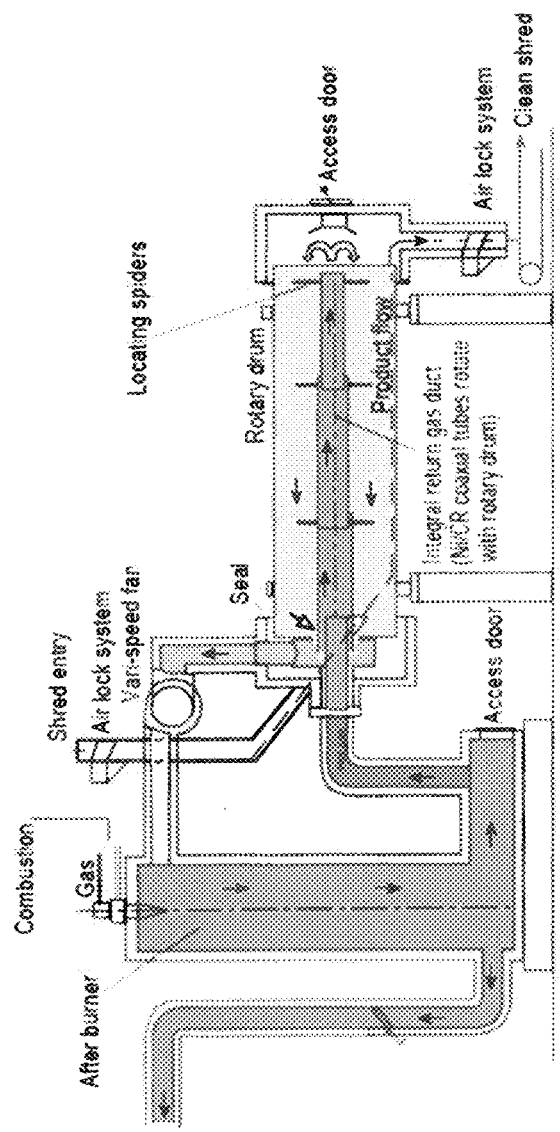
FIG. 1 depicts an example of a conventional aluminum recycling system used to remove organic materials from aluminum scrap metal.

While the invention is susceptible to various modifications and alternative forms, specific embodiments have been shown by way of example in the drawings and will be described in detail herein. It should be understood, however, that the invention is not intended to be limited to the particular forms disclosed, but rather covers modifications, equivalents, and alternatives falling within the spirit and scope of the invention as set forth herein, aspects of which are further defined in the appended claims.

DETAILED DESCRIPTION OF THE INVENTION

In accord with at least some aspects of the present concepts, a Multiple Hearth Furnace (MHF) is provided to burn off any type of organic material (e.g., paint, plastic, lacquer, etc.) from aluminum scrap prior to further processing. The core design of the disclosed MHF has some inherent advantages that should be of benefit for this process, but the furnace only functions as part of a system.

Figure 2A:
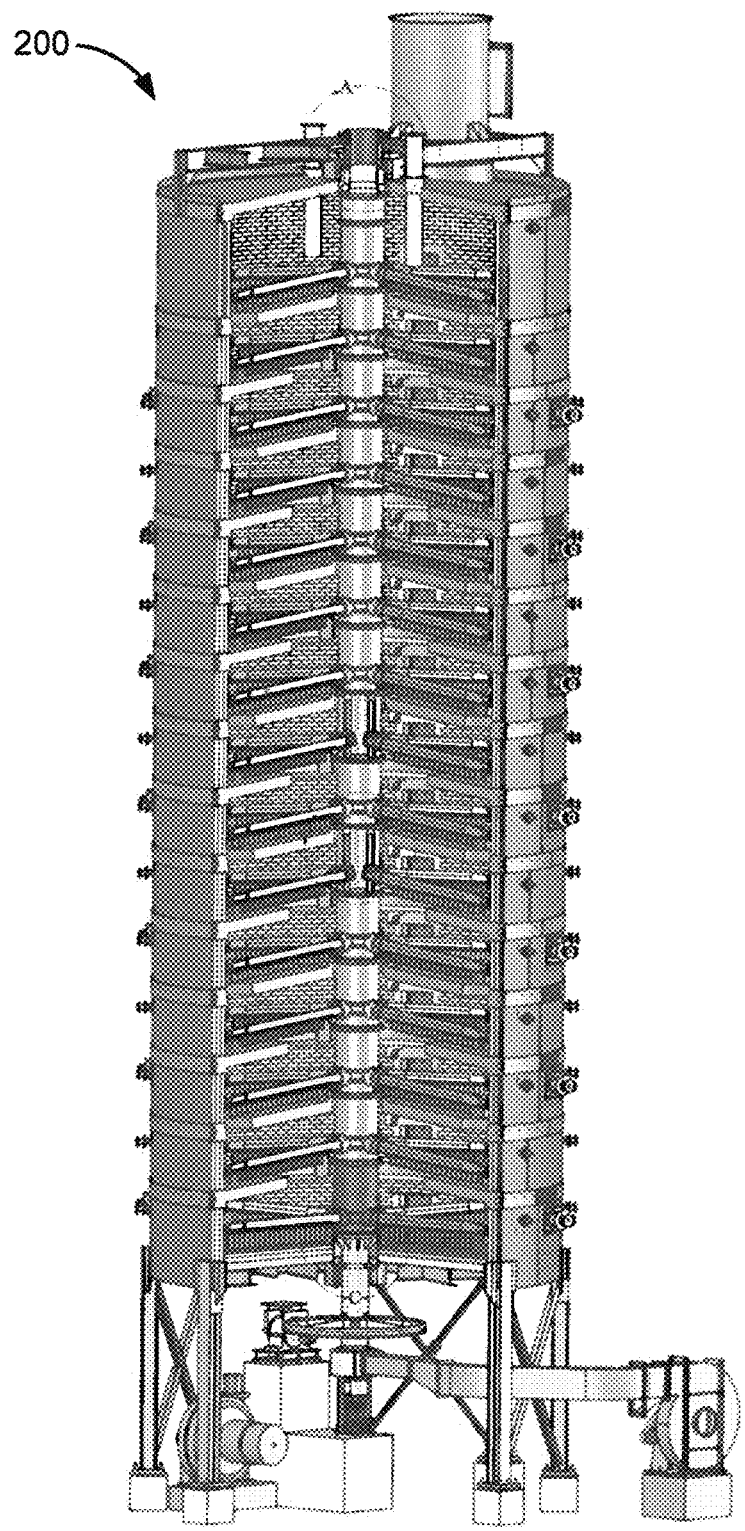
FIGS. 2A-2F show aspects of a multiple-hearth furnace (MHF) used to remove organic materials from aluminum scrap metal in accord with at least some aspects of the present concepts.
Figure 2B:
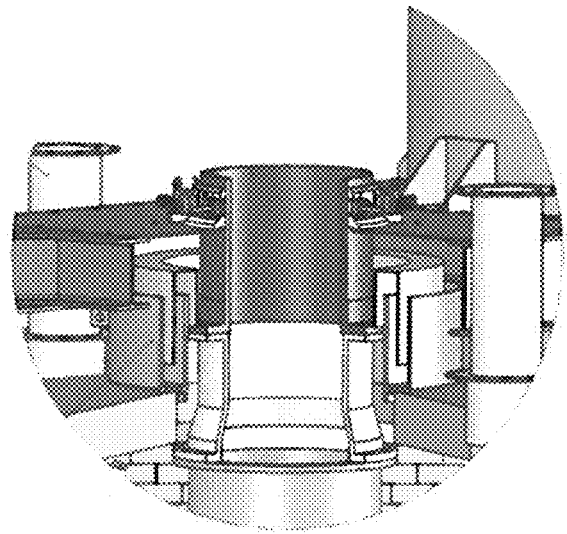
Figure 2C:
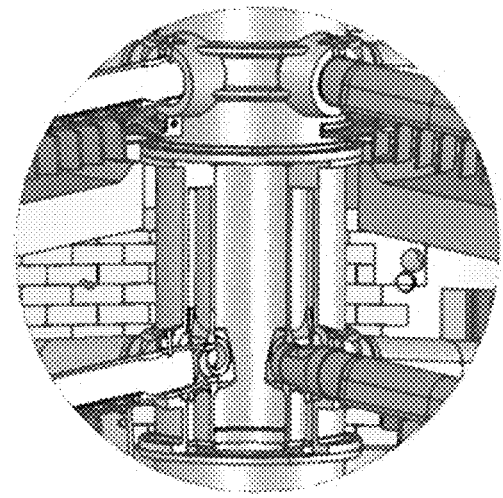
Figure 2D:
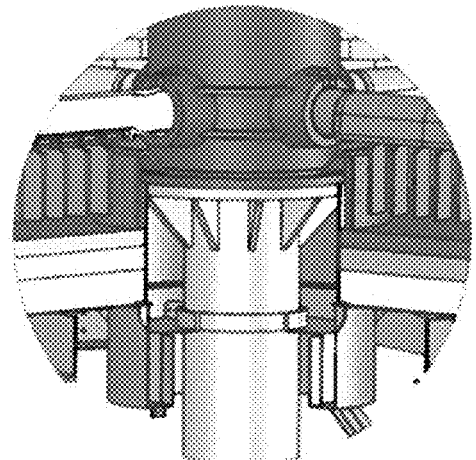
Figure 2E:
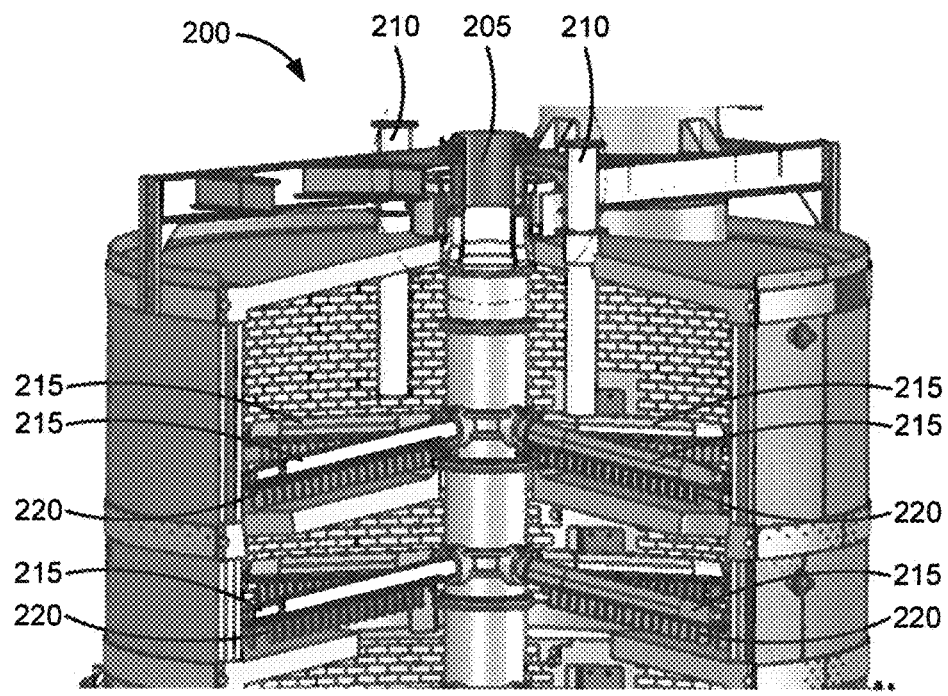
Figure 2F:
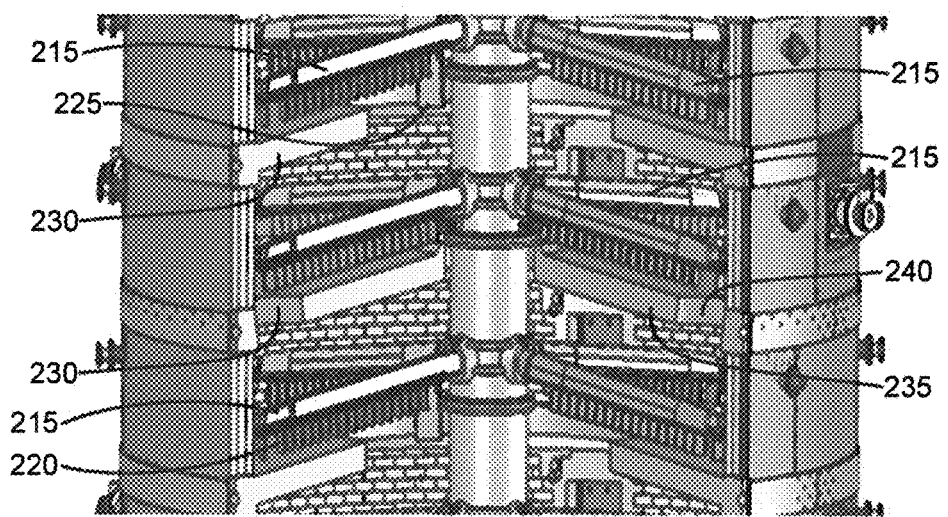

FIG. 2A shows an isometric drawing of a Multiple Hearth Furnace (MHF) 200 utilized in accord with at least some aspects of the present concepts, with enlarged isometric views of FIGS. 2B-2D showing specific details of the MHF of FIG. 2A. FIG. 2E show additional details of the MHF 200 of FIG. 2A, particularly the centershaft 205, feed ports 210, rabble arms 215 and rabble teeth 220. FIG. 2F show additional details of the MHF 200 of FIG. 2A, particularly the in-hearth drop hole 225, in-hearth 230, out-hearth 235 and out-hearth drop hole 240.

The MHF 200 depicted in FIG. 2A, and depicted in part in the views of FIGS. 2B-2F, comprises a series of self-supporting three dimensional arches, known as hearths, stacked one on top of the other. The refractory materials (e.g., refractory brick, etc.) are depicted in yellow for clarity. There are two types of hearths in the MHF 200: in-hearths 230 and out-hearths 235, such as is shown in FIG. 2F. The centershaft 205 protrudes through the center of the MHF 200, and contains rabble arms 215 on each hearth, the rabble arms comprising rabble teeth 220 (see FIG. 2E) that move the material (e.g., aluminum scrap, etc.) in the hearth. The residence time of the material in each hearth can be varied based on adjustments to the rabble pattern (e.g., one or more of the rabble teeth and/or rabble arms may be adjusted to keep material on certain hearths for longer or shorter durations) and/or centershaft 205 speed (e.g., a Variable Speed Drive on the centershaft is used to increase or decrease the speed depending on the process parameters). The material (e.g., aluminum scrap, etc.) is fed through the top of the MHF 200 near the centershaft 205 onto an out-hearth 235, and is gently moved (or "rabbled") by the rabble teeth 220 outwards towards the shell of the MHF. An out-hearth 235 comprises several drop holes 240 along the outside perimeter of the hearth, which allow the material to fall down to the in-hearth 230 disposed below the out-hearth (see, e.g., FIG. 2F). The material on the in-hearth 230 is then raked by rabble teeth inwardly toward the center of the furnace, where the material falls through in-hearth drop holes 225 to an out-hearth 235 disposed below the in-hearth. The material continues this process of moving through alternating out-hearths 235 and in-hearths 230 until it is discharged out of the bottom of the MHF 200.

In accord with at least some aspects of the present concepts, the Multiple Hearth Furnace 200 is, as noted above, used to de-coat aluminum-containing scrap metal that is contaminated with organic compounds. The hearths of the MHF 200 are each heated with a multiple burner arrangement (e.g., an Industrial Furnace Company (IFCO) Multiple Hearth Furnace burner system, manufactured by IFCO of Rochester, N.Y., etc.), the burners utilizing fuel such as, but not limited to, natural gas, propane, or oil. The de-coating treatment performed in the hearths and described herein is desirably performed in a slightly negative pressure environment (e.g., between about minus 0.5" of water column to about minus 5.0" of water column") with a low oxygen content (e.g., between about 0%-4% depending upon hearth location in the process). These hearths in the MHF 200 are operated under a low oxygen content to facilitate control of the process. However, to enable operation under these conditions, a traditional multiple hearth system is required to be redesigned.

In the MHF 200 in accord with the present concepts, seals, access hatches, steel shell joints, roof joints, and/or floor joints of one or more hearths in the MHF are sealed to minimize or prevent oxygen from entering the hearth through such points and surfaces, which would impair, in accord with the present concepts, the ability to control the amount and location of combustion of volatiles. In some aspects, the seals, access hatches, steel shell joints, roof joints, and/or floor joints of the one or more hearths in the MHF are advantageously, but not necessarily, sealed to near "bubble tight" standards. Such sealing measures, and corresponding minimization of, or prevention of, oxygen (e.g., tramp oxygen that does not pass through the burners) from entering the hearth(s) of the MHF 200 through such points and surfaces, facilitates, in accord with the present concepts, improved control over the amount of and the location of volatiles combustion. With such modifications, the MHF 200 in accord with at least some aspects of the present concepts is suited to effect controlled injection of combustion air at desired quantities and locations, utilizing conventional control systems and methods, to enable previously unavailable levels of fine tuning (e.g., of oxygen level, etc.) and cascading controls.

Within the MHF 200, the aluminum de-coating process in accord with the present concepts comprises four general processing zones: (1) Drying (used to dry off the moisture in the scrap aluminum), (2) Heating (heating the scrap aluminum toward the point where volatiles begin to come off, or evaporate), (3) De-volatilizing (as the coating heats and evaporates, volatiles are driven off), and (4) De-charring (during the de-volatilizing process, a portion of the volatiles are turned to char). In the de-charring zone, the carbon (char) is burned off of the aluminum, and small amounts of ash are left. This ash is inherently present as a result of the destruction of the organics, and will be found in the same form and quantity (depending on destruction efficiency) after de-coating using prior art. Multiple methods of separating the ash have been conventionally employed, such as screening, settling, or air entrainment, and one or more of these methods can be used, depending on the particular situation.

In accord with the present concepts, the MHF 200 may comprise a MHF of any size (e.g., a commercial size 54" outside diameter (OD) to 25'9" OD) and any number of hearths (e.g., four or more hearths). The size of a MHF 200 in accord with the present concepts imposed limitations on a feed rate of the feed stock (e.g., aluminum, plastic laminates, etc.), with larger MHFs generally supporting higher feed rates and output rates than smaller MHFs.

Each of the aforementioned processing zones (e.g., drying, heating, etc.) may comprise one hearth or multiple hearths, with sequential hearths (either within a zone, or between zones) alternating between and in-hearth (230, FIG. 2F) and out-hearth (235, FIG. 2F). The number of hearths may vary as between the processing zones such that different zones may have differing numbers of hearths. For example, one zone may comprise two hearths (an in-hearth 230 and an out-hearth 235), while another zone may comprise three hearths (e.g., two out-hearths and one in-hearth or two in-hearths and one out-hearth). As another example, one zone may comprise a single hearth, while another zone may comprise four hearths.

The coatings and/or other residual organics on the aluminum scrap act as a fuel source, and the reaction of the coatings and/or other residual organics on the aluminum scrap provide fuel for, and heat to, the recycling process. The surface area of the hearths, and the rabbling of the scrap material are configured to facilitate, if not maximize, gas contact and heat transfer between the hearth atmosphere and the processed aluminum scrap, and to minimize specific energy consumption. In accord with at least some aspects of the present concepts, particularly the special atmospheric conditions within the MHF 200 in a configuration wherein all of the hearths comprising the MHF are sealed as noted above, the processing described herein produces, at the outlet of the MHF, a metal with little to no surface oxidation, as is evident in FIGS. 9-25. In contrast, historically, other de-coating equipment has failed to successfully remove the coatings, and had a high oxidation rate. There has also been a general acceptance in the industry that residual carbon (char) left on the aluminum from the removal of the coatings could simply not be removed from the aluminum. However, using the system(s) and process(es) described herein, it has been determined that utilization of a Multiple Hearth Furnace 200, particularly as configured as noted above to seal against ingress of unwanted oxygen through any one or more of a variety of identified leakage points, is able to successfully remove the carbon (char) and produces a complete de-coating of the scrap material to yield an aluminum material output that is clean with a low level (e.g., near zero) of surface oxidation, as is facially evident in FIGS. 9-25.

Figure 24:
FIG. 24 shows (left) folded blue laminated foil, such as shown in FIG. 22 before De-Coating in accord with at least some aspects of the present concepts and (right) folded blue laminated foil, such as shown in FIG. 22 after De-Coating in accord with at least some aspects of the present concepts.
Figures 25, 26:
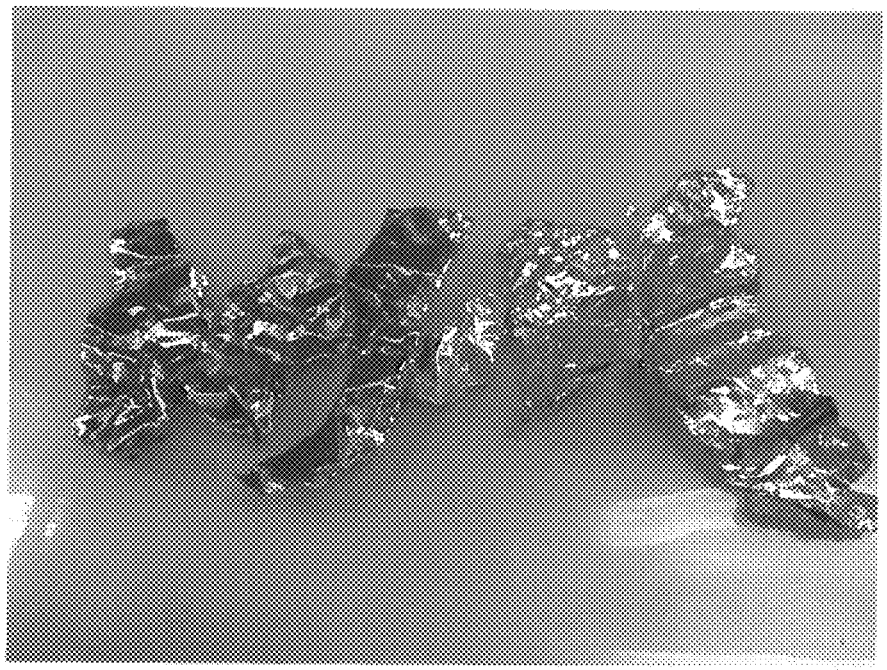
FIG. 25 shows (left) unfolded blue laminated foil, such as shown in FIG. 22 before De-Coating in accord with at least some aspects of the present concepts and (right) unfolded blue laminated foil, such as shown in FIG. 22 after De-Coating in accord with at least some aspects of the present concepts.
FIG. 26 shows MHF De-Coating test results comparing MHF aluminum recovery rates in accord with at least some aspects of the present concepts with a conventional charge furnace process.

A benefit realized by the present concepts utilizing a Multiple Hearth Furnace 200, relative to the alternative methods of de-coating aluminum, is the ability of the MHF to handle any scrap type, including highly volatile scrap (25%+ by weight) which is not even attempted to be processed using conventional systems, within one piece of equipment. As noted, FIGS. 11-27 show before and after pictures of six different types of materials (UBC (FIGS. 9-10), lotion bottles (FIGS. 11-13), painted siding (FIGS. 14-15), transformer wire (FIGS. 16-17), laminated foil (FIGS. 18-21) and blue laminated foil (FIGS. 22-25)) processed and de-coated in accord with at least some aspects of the present concepts. For each of these six different types of materials, FIG. 26 shows the high recovery rates for the aluminum de-coating system and processes in accord with the present concepts, using a Multiple Hearth Furnace, in comparison to a conventional batch (charge) furnace system and process. As is shown in FIG. 26, the present concepts have realized significant improvements in recovery over conventional systems and processes, yielding improvements in recovery, to date, between 8.5% to 42%.

It is important to note that beverage pouch containers, referred to herein as "laminated foils," falls into the high VOC category of scrap (i.e., 25%+ by weight), and comprises a 40-60% aluminum content by weight. While industrial automated scrap separation methods (air knife, screens, magnetic or eddy current separation) are very effective on most materials, in the case of the pouch or box type containers ("laminated foils") within the scrap stream, these scrap separation methods simply remove the laminated foils as waste, as they have proven difficult to recycle using conventional methods. Consequently, conventionally such laminated foils (e.g., pouch or box containers) are treated as trash and sent to a municipal land fill (100% loss of the aluminum content).

Packaging Machinery Manufacturers Institute (PMMI), the association for packaging and processing technologies, cited in a recent survey that beverage pouch containers are expected to grow as much as 105.9% between 2010 and 2020 (Source: PMMI). The packaging industry touts the benefits of these beverage pouch containers due to their light weight relative to their volume (Source: PPMI). When compared with glass or plastic bottles, the volume of fluids transported in a truckload of beverage pouch containers would require nine truckloads for transport if glass or plastic bottles were used instead (Source: PMMI).

While these beverage pouch containers (laminated foils) may be efficient in terms of transportation of packaged goods, their ability to be recycled has proven difficult using the current de-coating methods. There have been many attempts to recover this highly volatile scrap, but none have been successful on a production scale. The polyethylene terephthalate (PET), or plastic component of the container is bonded to the aluminum layer of the container wall and is extremely difficult to separate using conventional methods. These beverage pouch containers usually contain multiple layers including adhesives, polyethylene, and paint on top of, or between the aluminum. Many of these beverage pouch containers further each comprise a plastic straw or cap (see, e.g., FIG. 13), which contributes to the difficulty in processing. Prior attempts to de-coat these beverage pouch containers have destroyed most of the aluminum layer during the separation pyrolysis process. Numbers released by the beverage industry indicate that billions of these beverage pouch containers are sent to land-fills each year. The estimated aluminum lost to land-fill disposal of beverage pouch containers is greater than 1 Billion pounds per year in the United States alone.

Figure 19:
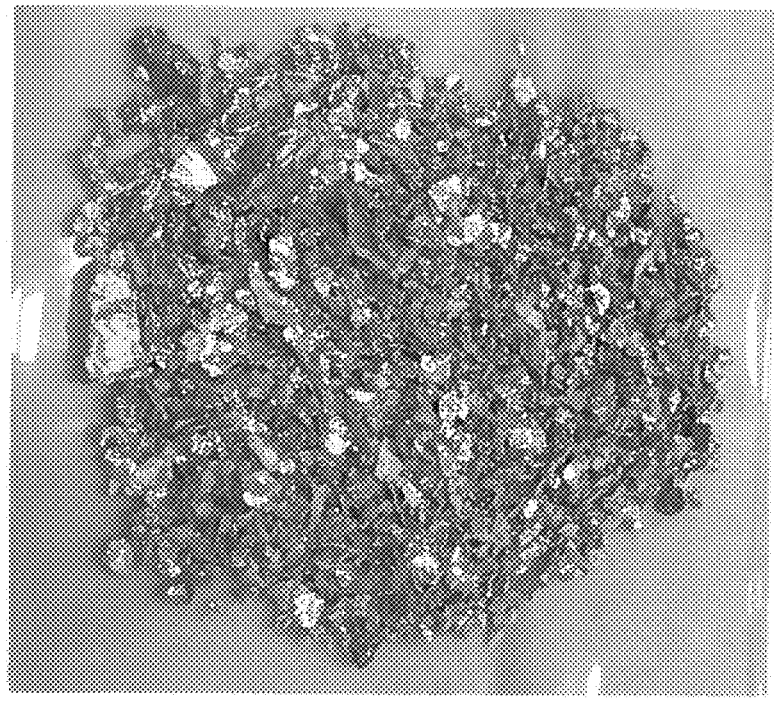
FIG. 19 is a color image showing the laminated foil of FIG. 18 after De-Coating in accord with at least some aspects of the present concepts using the MHF of FIGS. 2A-2F.
Figure 20:
FIG. 20 is a color image showing folded-up laminated foil after De-Coating in accord with at least some aspects of the present concepts using the MHF of FIGS. 2A-2F.
Figure 21:
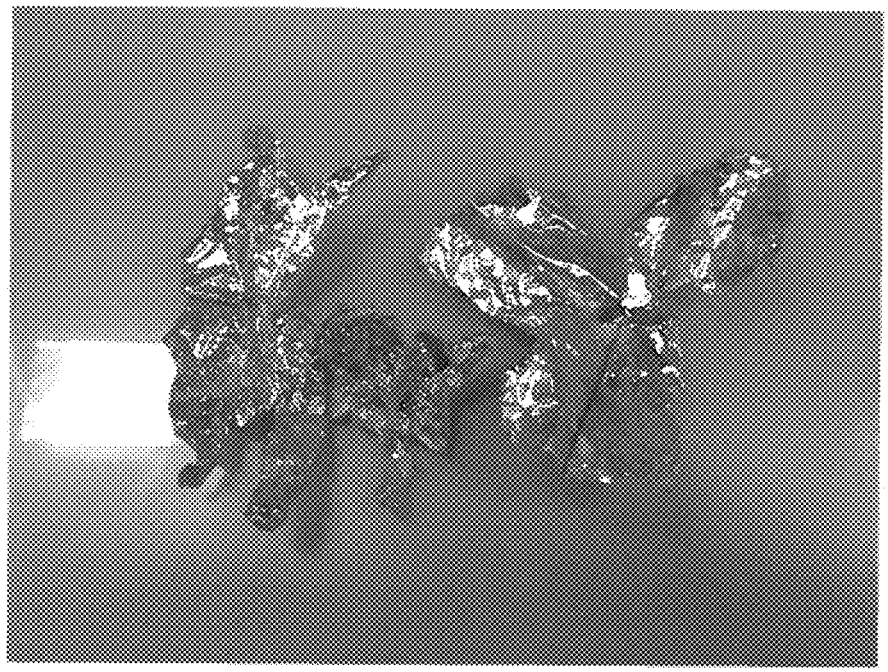
FIG. 21 is a color image showing the folded-up laminated foil from FIG. 20 after unfolding to show a lack of organics or residue.
Figure 22:
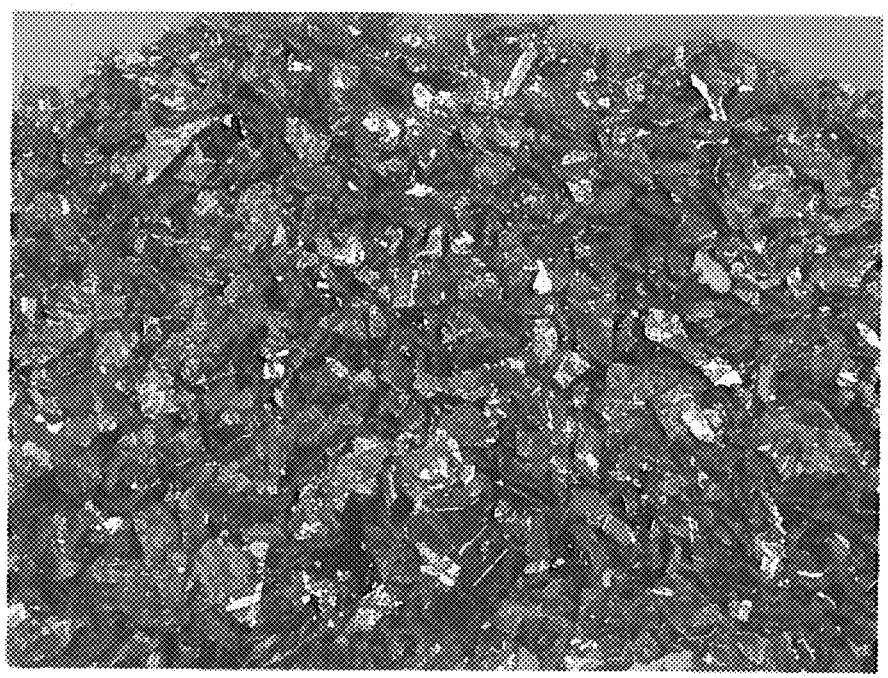
FIG. 22 is a color image showing blue laminated foil before De-Coating in accord with at least some aspects of the present concepts using the MHF of FIGS. 2A-2F.
Figure 23:
FIG. 23 is a color image showing the blue laminated foil from FIG. 22 after De-Coating in accord with at least some aspects of the present concepts using the MHF of FIGS. 2A-2F.

Testing results of the de-coating systems and processes disclosed herein have shown that, when treating the pouch or box containers in accord with at least some aspects of the present concepts, the aluminum retains its form and the coatings are completely removed as shown in FIG. 19 and FIG. 23. As is shown in FIGS. 9-25, the de-coated material yielded by the systems and processes disclosed herein is clean, bright and free of any evidence of pyrolysis. The de-coated material inherently has folds and overlaps, but the exit material was free of all coatings and plastic, even within these folds and overlaps. FIG. 20 shows examples of laminated foil after de-coating wherein some of the laminated foil pieces are characterized by folds and overlaps. FIG. 21 shows these same exact laminated foil pieces in an unfolded state. As is evident in FIG. 21, when the inside of the overlaps are exposed (i.e., opened as shown), there is no coating left on the aluminum, proving that the systems and processes disclosed herein effectively remove all coatings from even the most difficult-to-process scrap materials. Similarly, as to the blue laminated foil, FIGS. 24-25 show a side-by-side comparison of folded blue laminated foil before de-coating (FIG. 24, left) and folded blue laminated foil after de-coating in accord with at least some aspects of the present concepts (FIG. 24, right) as well as a side-by-side comparison of unfolded blue laminated foil before de-coating (FIG. 25, left) and unfolded blue laminated foil after de-coating in accord with at least some aspects of the present concepts (FIG. 25, right). As is evident in FIGS. 24-25, the blue laminated foil is entirely de-coated when unfolded, despite the blue laminated foil being folded and overlapped while in the furnace.

The present system, which advantageously utilizes a Multiple Hearth Furnace 200 such as shown by way of example in FIGS. 2A-2F, in combination with conventional control systems, facilitates flexible and accurate time-based control of each part of the process. Significantly, the system is adaptable to permit the control system to store, in a non-transient computer-readable memory device, separate instruction sets (e.g., operating conditions, procedures, states, etc.) corresponding to different scrap types. This variability enables the present system to adapt to changes in the packaging industry, which is continually evolving and applying new improvements, such as new coating types. There are, in essence, an infinite number of permutations of coating compositions, and each different combination requires different process parameters to successfully remove the coating. With the disclosed system, utilizing a Multiple Hearth Furnace 200, operational parameters such as retention time, temperature, and oxygen level are able to be changed to accommodate the de-coating process and optimize for any scrap type.

Figure 3:
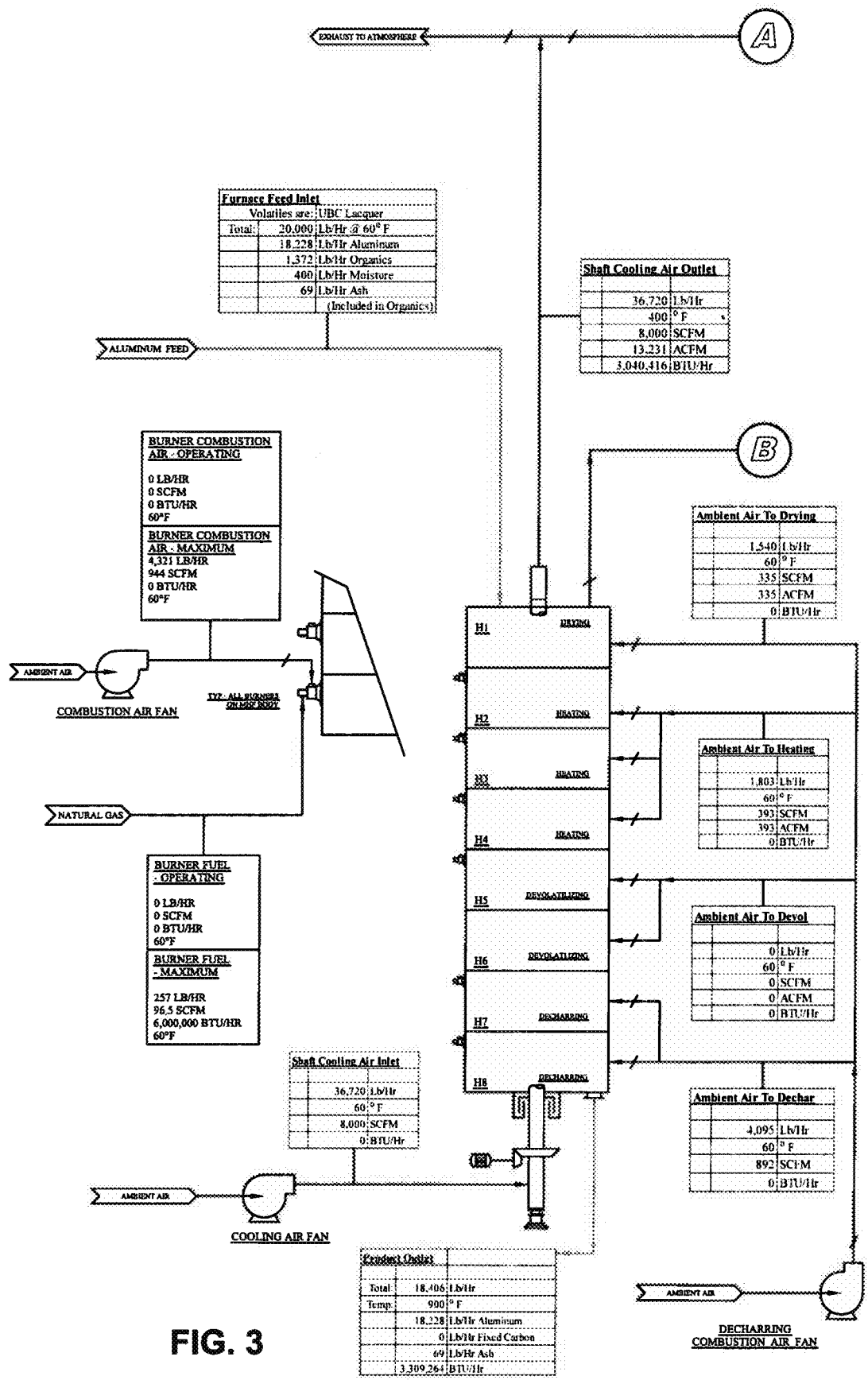
FIG. 3 shows an aluminum recycle MHF flowsheet in accord with at least some aspects of the present concepts.
Figure 3:
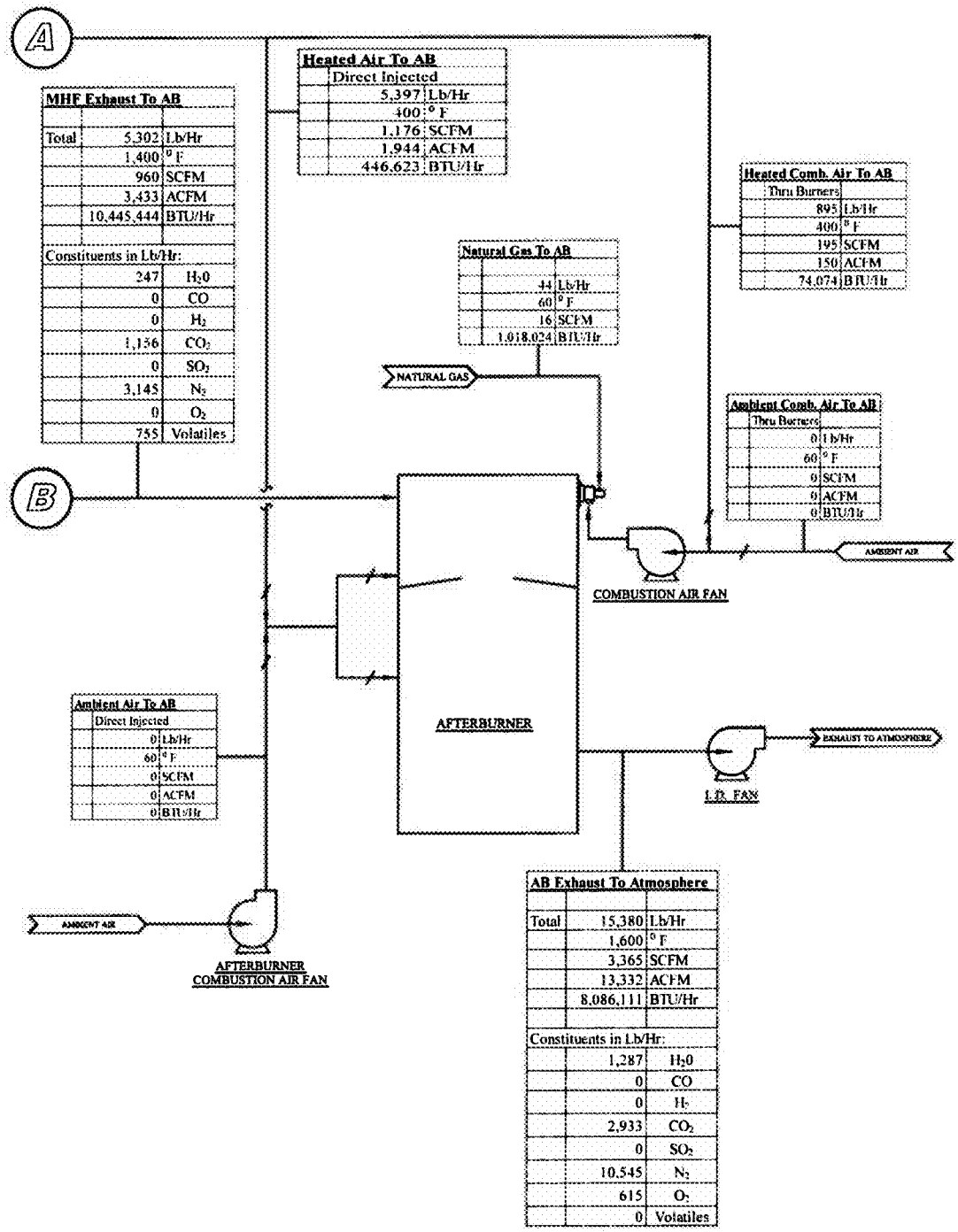

One embodiment of the present concepts is shown in FIG. 3, which depicts exhaust gas location(s), furnace process zoning, internal atmosphere management in each zone (e.g., Oxygen and combustible organics), and exhaust gas recycling to provide, in combination, the above-noted process acts of drying, heating, devolatilizing, and de-charring. In this embodiment, an eight hearth MHF 200 is utilized, the eight hearths (#1-#8) forming, in combination, four processing zones. In the embodiment of FIG. 3, hearth #1 comprises the drying zone, hearths #2-#4 comprise the heating zone, hearths #5-#6 comprise the devolatilizing zone and hearths #7-#8 comprise the de-charring zone. In other aspects of the present concepts, a lesser number of hearths (e.g., two hearths) or a greater number of hearths (e.g., five or six hearths) could be used.

It is to be noted that, although FIG. 3 shows exemplary values for process variables, such as actual flow rates and temperatures, by way of example, the present concepts are not limited to the indicated values. Further, where ranges of values are indicated, it is to be understood that actual values (or ranges of values therein) may be utilized in accord with, and optimized for, particular processes (e.g., materials to be processed).

Advantageously, the MHF 200 is configured to preheat and/or dry the feedstock materials (e.g., scrap materials containing aluminum) with recovered waste heat to heat the product under zero-oxygen conditions or near-zero oxygen conditions using fuel (including fuel from the volatiles in the aluminum feed) and recycled exhaust gas, to exhaust the furnace to remove all volatile compounds, and to burn off the remaining fixed carbons in the lower section of the furnace. It is important to note that exhausting may occur from varying locations including the top, middle, and bottom depending on factors such as process analysis, or cost considerations. As one example, such as is shown in FIG. 3, the furnace is exhausted from the top, which means that gases will flow counter-currently to the aluminum, with heat provided by the heat from the gases, as well as combustion of the volatiles in the gases.

Further to the schematic shown in FIG. 3, showing one example of a system in accord with aspects of the present concepts, FIGS. 4A-8B show tables summarizing the mass and heat balances of each of the furnace zones shown in FIG. 3. The particular mass and heat balance illustrated is premised upon a scrap material composition typical for Used Beverage Cans (UBC), which contains 7% organics by weight. The temperatures and flow rates are specific to this particular example and configuration and are presented for illustrative purposes, not for limitation, and can be varied to provide for different preferred processing schemes or desired outcomes.

Figure 4A:
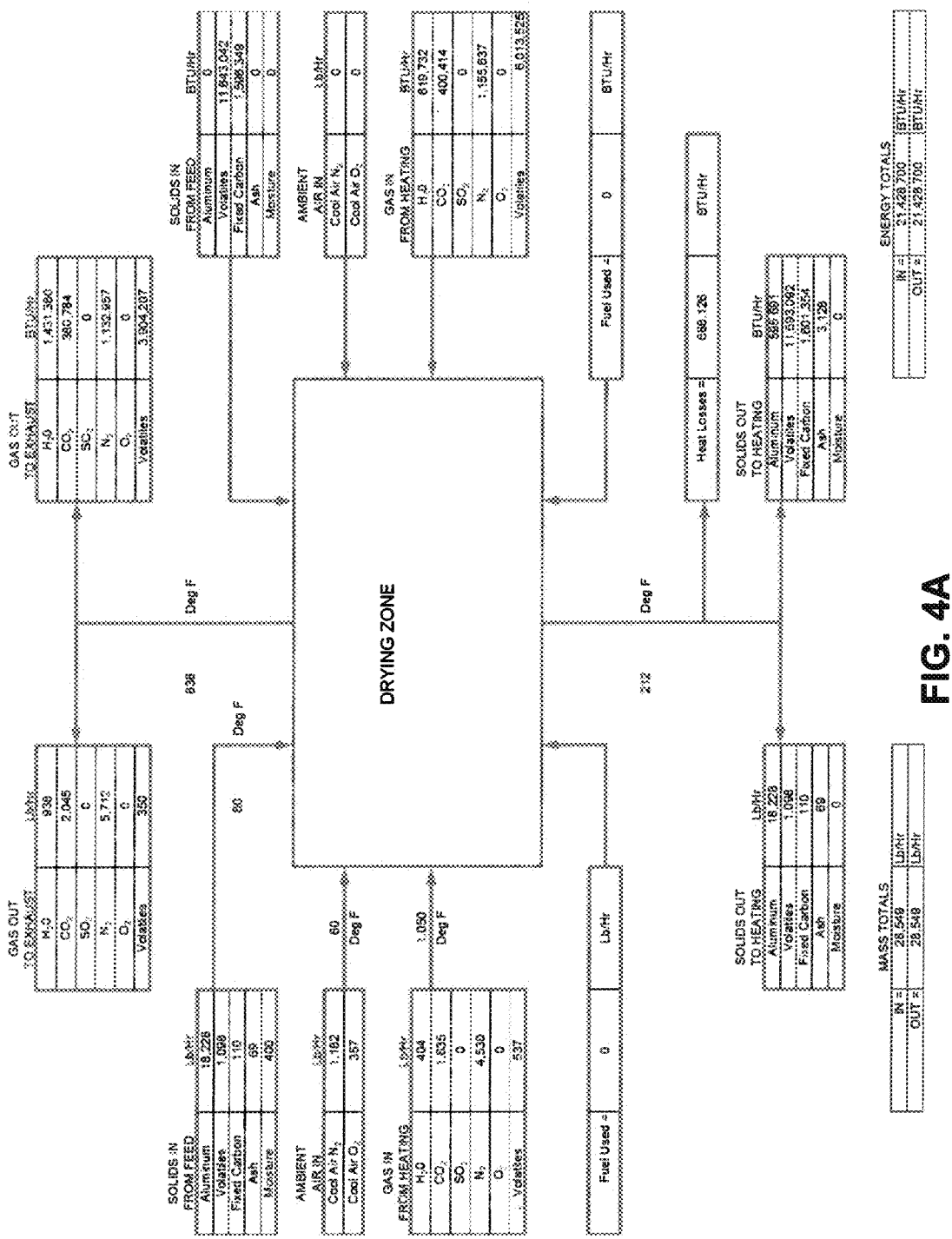
Figure 5A:
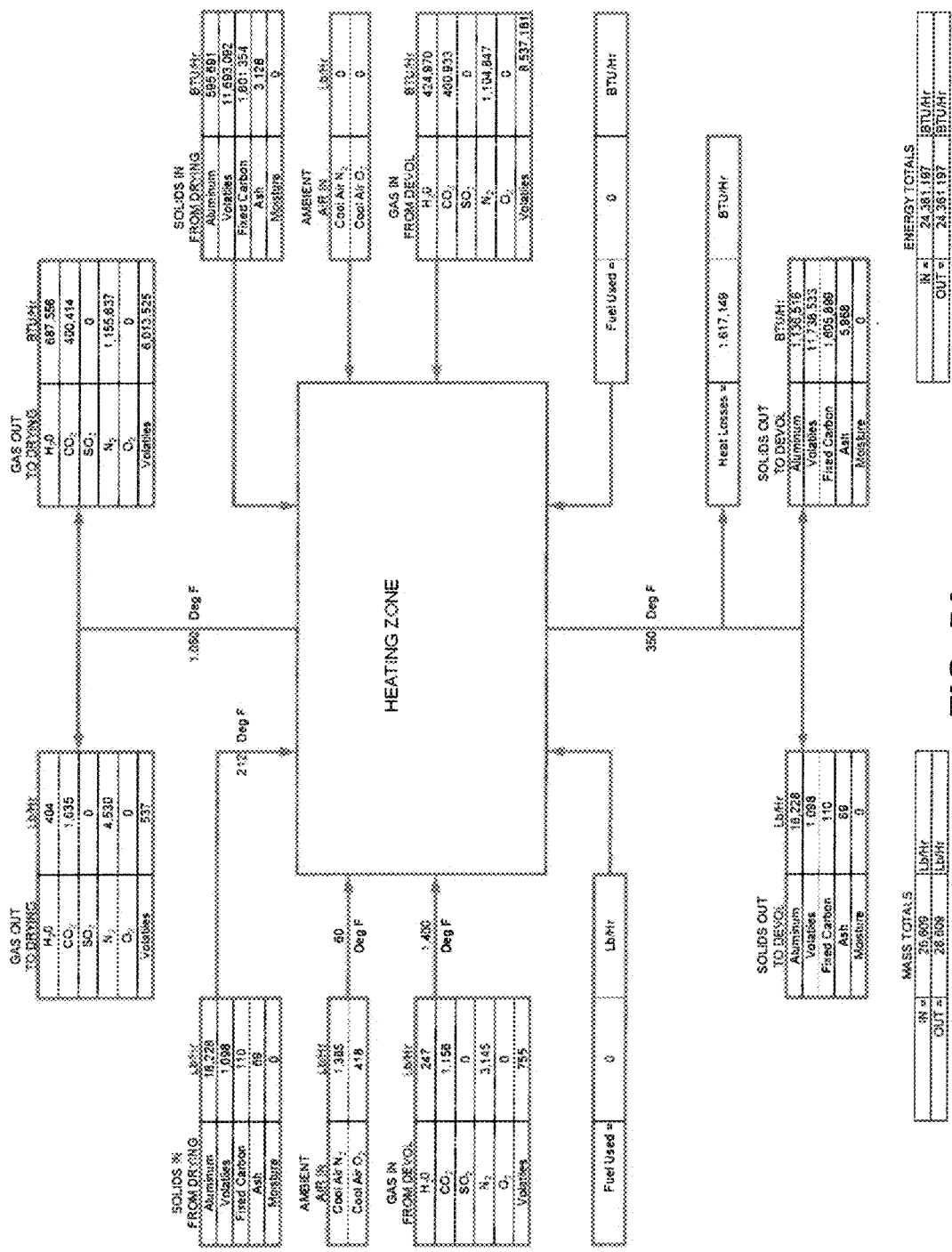

FIG. 4(a) shows, for example, that the aluminum enters the drying zone with 2% water by weight in the feed, equating to 400 lb/hour for this example (see "SOLIDS IN FROM FEED" at the left of FIG. 4(a) (see also, e.g., in FIG. 4(b) "Moisture" (column #1) and corresponding entry under "Lb/Hr" (column #2)). The drying zone heat is supplied by the 1,050° F. gases from the heating zone, as well as combustion of the volatiles in the gas at a rate of 187 lb/hr. The stoichiometric amount of $O_2$ is injected into the drying zone at 357 lb/hr (see "AMBIENT AIR IN" at the left of FIG. 4(*a*); see also, e.g., in FIG. 4(*b*) "Ambient Air Injection—Cool Air $O_2$" (column #1) and corresponding entry under "Lb/Hr" (column #2)) to combust 187 lb/hr of volatiles in the gas stream (i.e., the difference between the gaseous volatiles entering the drying zone from heating (e.g., 537 lb/hr as shown in "GAS IN FROM HEATING" at left of FIG. 4(*a*)), and the gaseous volatiles exiting the drying zone to exhaust (e.g., 350 lb/hr as shown in "GAS OUT TO EXHAUST" at top left of FIG. 4(*a*), leaving 1,098 lb/hr of volatiles in the scrap that passes to the next zone (see, e.g., "Volatiles" in "SOLIDS OUT TO HEATING" in FIG. 4(*a*)). This finite amount of $O_2$ ensures that no excess oxygen is left in the furnace, which causes oxidation of the aluminum. Aluminum oxidation creates $Al_2O_3$, also known as dross. Oxidation is undesirable, as it requires extreme thermal cycles to break down the $Al_2O_3$ in order to recover the aluminum from the dross, and causes an increase in metal loss through vaporization of the aluminum, and increases the total energy required to process secondary aluminum. The moisture in the aluminum scrap is evaporated by these two heat sources, and exits this zone as steam. The dry aluminum scrap continues to the heating zone. In accord with at least some aspects of the present concepts, a level of moisture of the product upon exit of the drying process is optimally maintained to be as low as possible as a value-added step to save energy and keep the water away from the rest of the equipment.

The dry aluminum enters the heating zone at 212° F. (see upper left of "Heating Zone" of FIG. 7(*a*)), and the aluminum continues to be heated from the 1,400° F. gases from the devolatilizing zone (see left side of FIG. 5(*a*) labeled "GAS IN FROM DEVOL") as well as combustion of the volatiles in the gas stream at a rate of 218 lb/hr. The stoichiometric amount of $O_2$ is injected into the heating zone at 418 lb/hr (see, e.g., FIG. 5(*b*) "Ambient Air Injection—Cool Air $O_2$" (column #1) and corresponding entry under "Lb/Hr" (column #2)) to combust 218 lb/hr of volatiles in the gas stream. Again, this ensures that no excess oxygen is left in the furnace, which causes oxidation of the aluminum if left in the furnace atmosphere. The aluminum is heated to 350° F., when it enters into the devolatilizing zone (see output from bottom of "Heating Zone" in FIG. 5(*a*)).

Figure 6A:
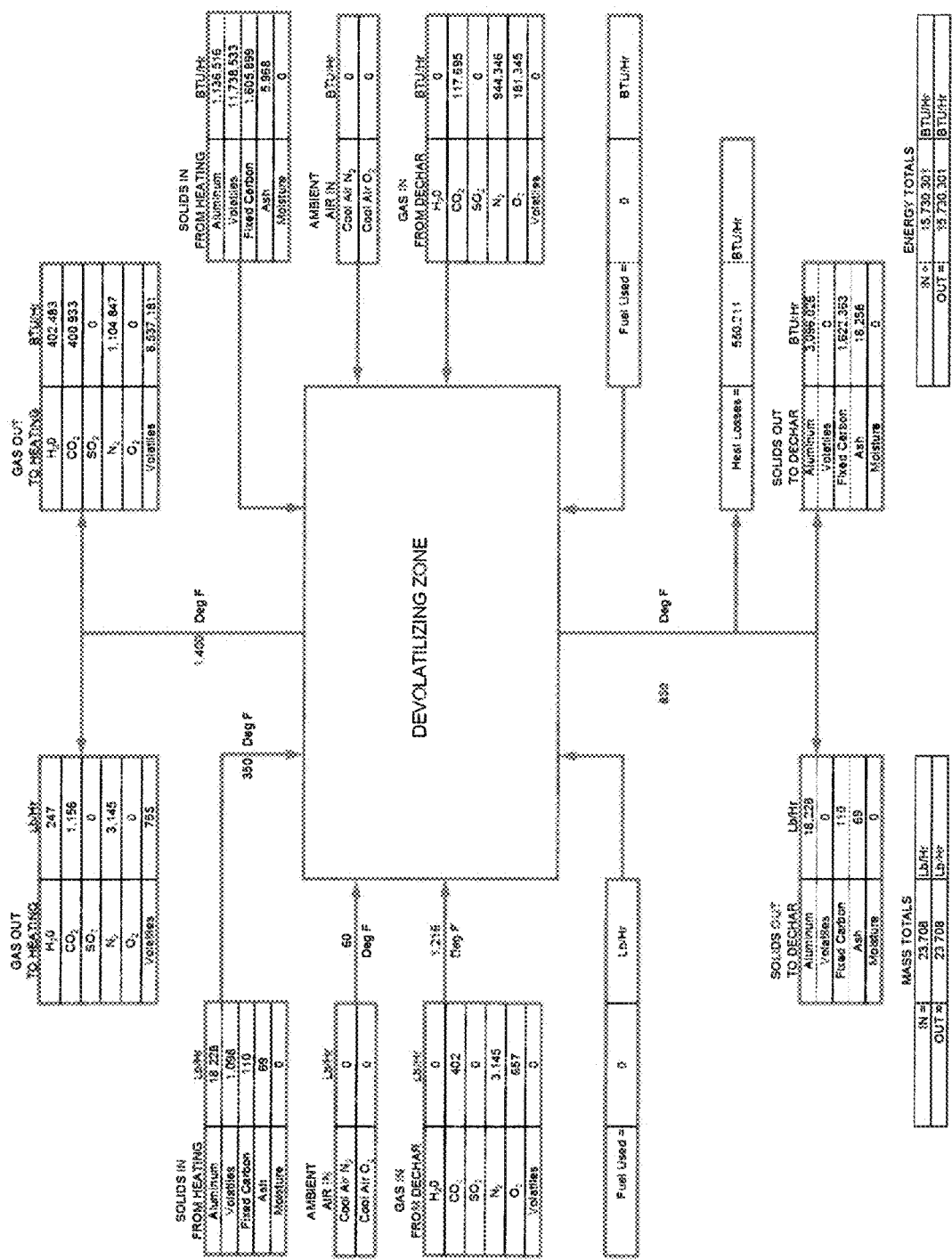
Figure 7A:
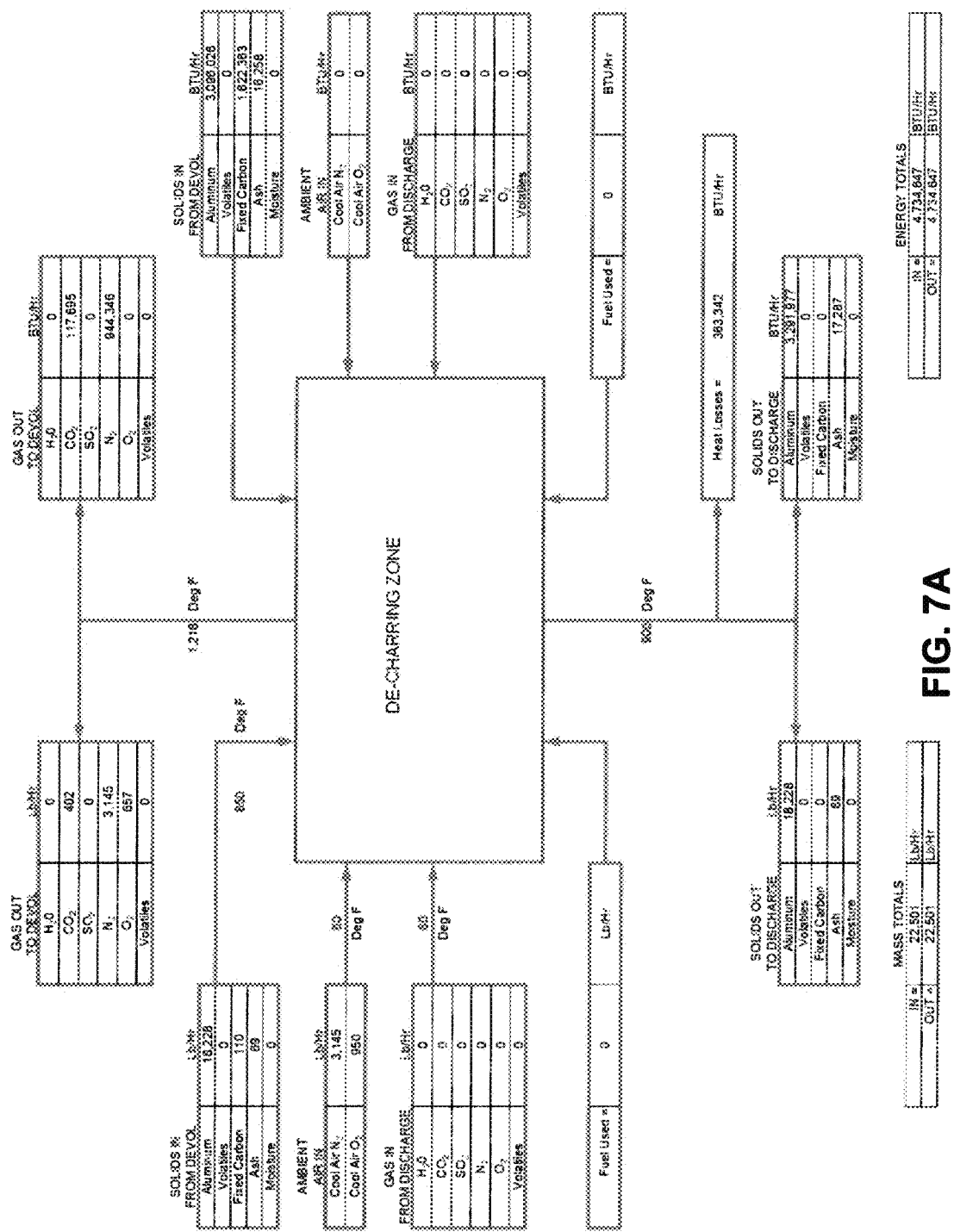
Figure 8A:
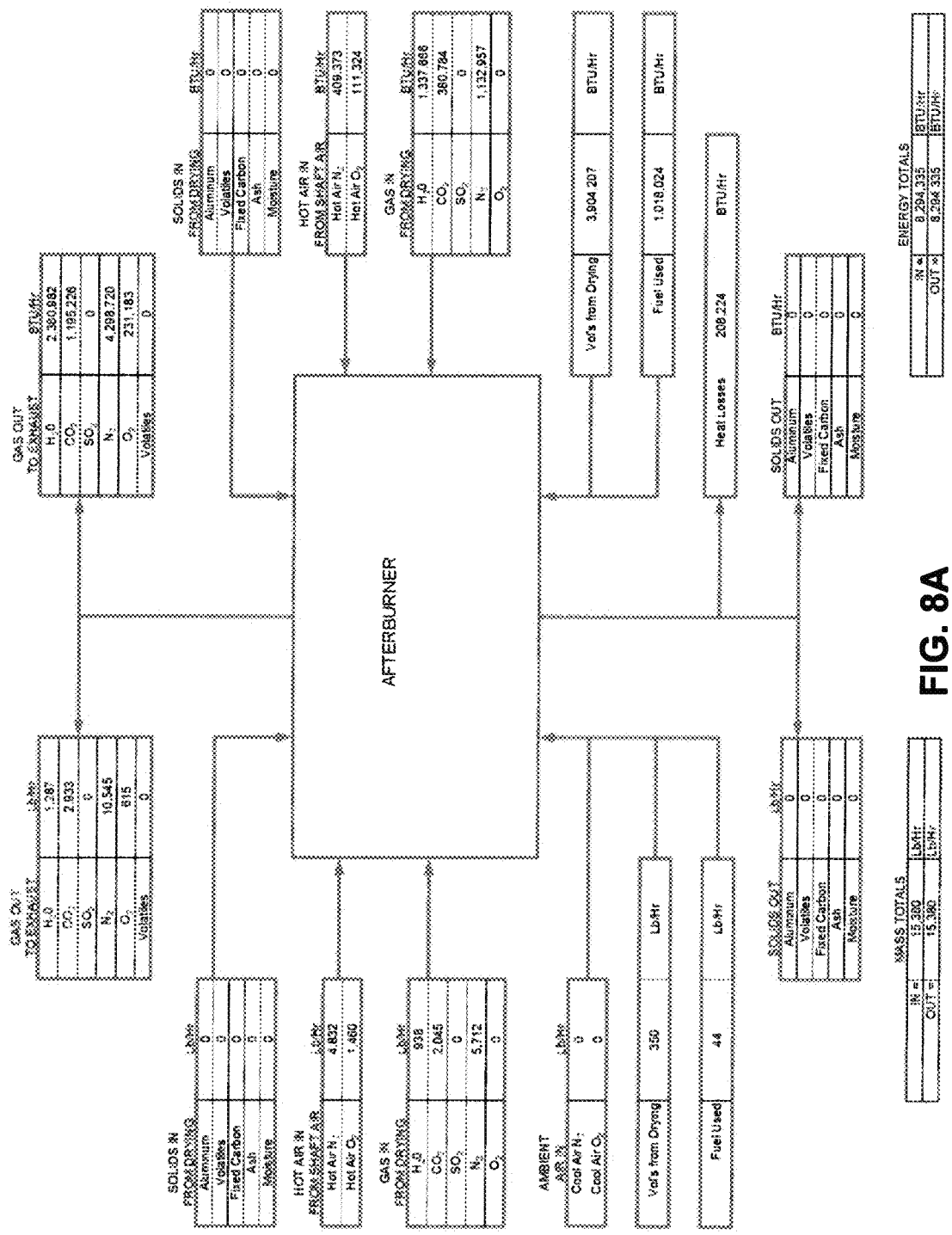
Figure 9:
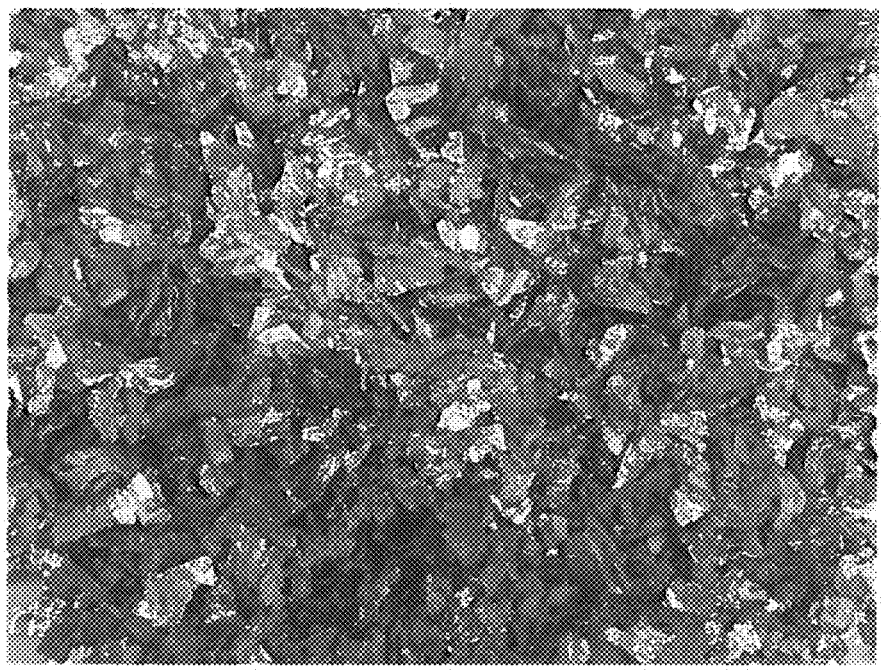
FIG. 9 is a color image showing used beverage containers (UBC) before De-Coating in accord with at least some aspects of the present concepts using the MHF of FIGS. 2A-2F.
Figure 10:
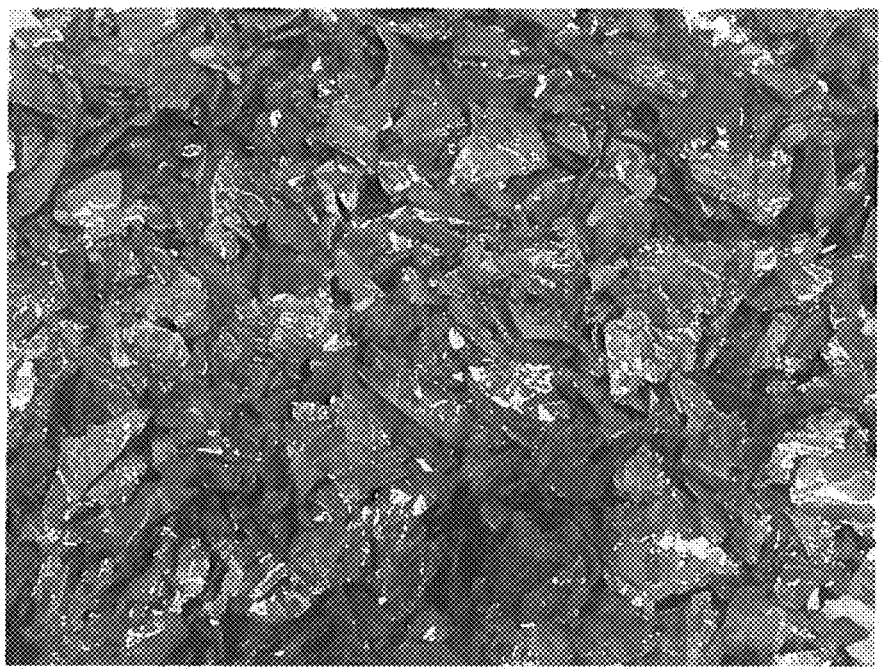
FIG. 10 is a color image showing the used beverage containers (UBC) of FIG. 9 after De-Coating in accord with at least some aspects of the present concepts using the MHF of FIGS. 2A-2F.
Figure 11:
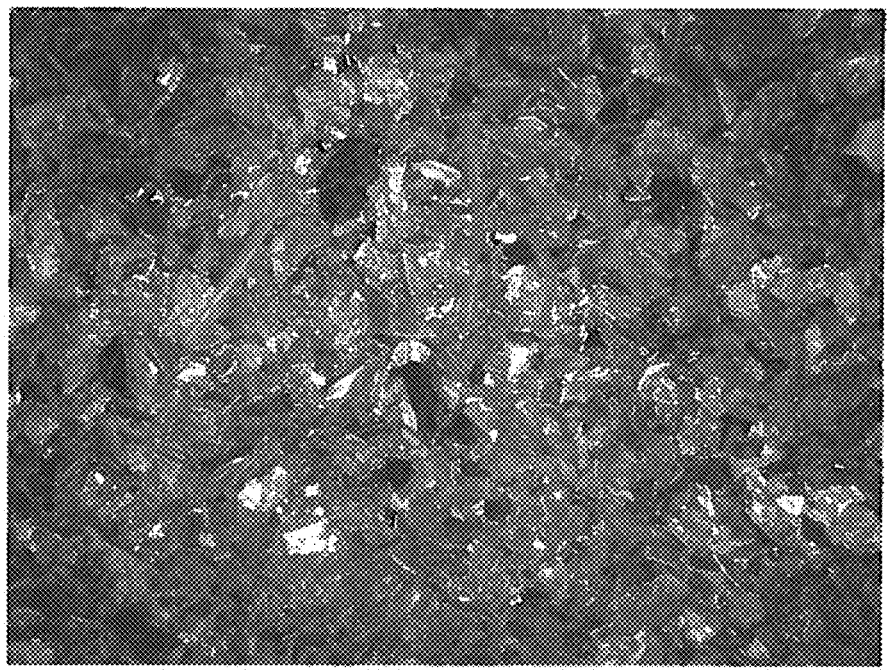
FIG. 11 is a color image showing used lotion bottles before De-Coating in accord with at least some aspects of the present concepts using the MHF of FIGS. 2A-2F.
Figure 12:
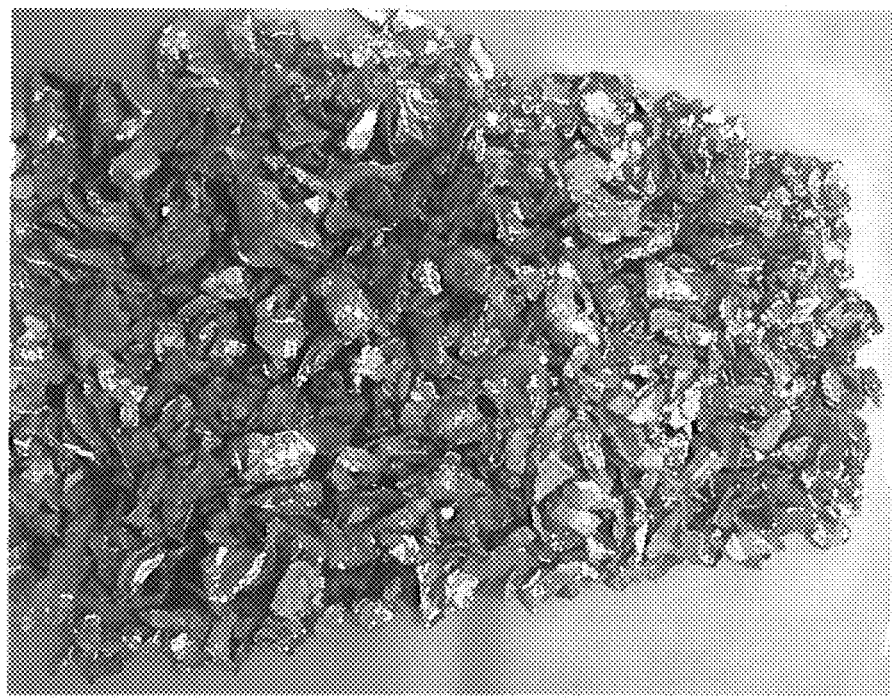
FIG. 12 is a color image showing the used lotion bottles of FIG. 11 after De-Coating in accord with at least some aspects of the present concepts using the MHF of FIGS. 2A-2F.
Figure 13:
FIG. 13 is a color image showing plastic straws contained in unprocessed lotion bottle scrap before De-Coating in accord with at least some aspects of the present concepts using the MHF of FIGS. 2A-2F.
Figure 14:
FIG. 14 is a color image showing pieces of siding before De-Coating in accord with at least some aspects of the present concepts using the MHF of FIGS. 2A-2F.
Figure 15:
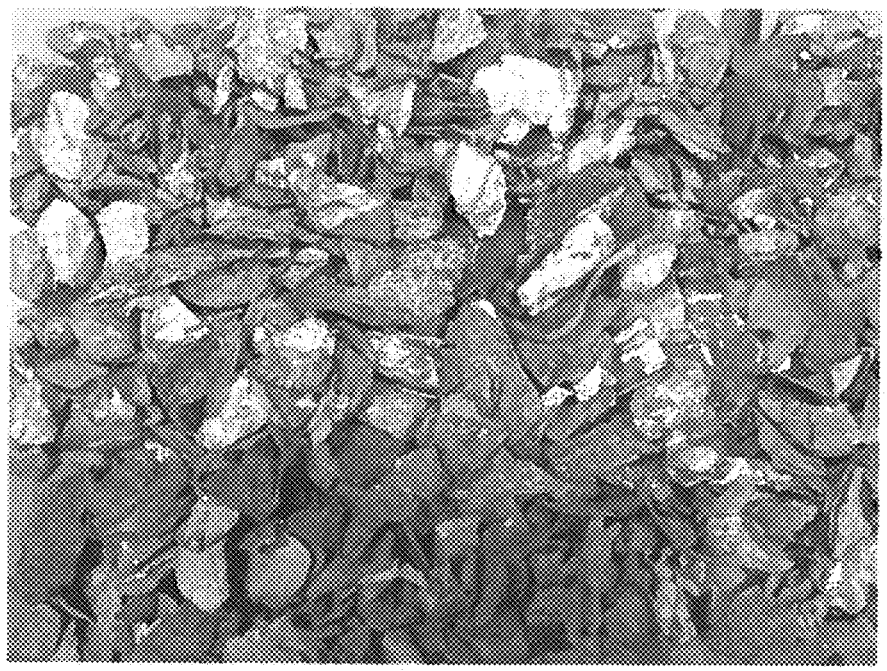
FIG. 15 is a color image showing pieces of the siding of FIG. 14 after De-Coating in accord with at least some aspects of the present concepts using the MHF of FIGS. 2A-2F.
Figure 16:
FIG. 16 is a color image showing transformer wire before De-Coating in accord with at least some aspects of the present concepts using the MHF of FIGS. 2A-2F.
Figure 17:
FIG. 17 is a color image showing transformer wire of FIG. 16 after De-Coating in accord with at least some aspects of the present concepts using the MHF of FIGS. 2A-2F.
Figure 18:
FIG. 18 is a color image showing laminated foil before De-Coating in accord with at least some aspects of the present concepts using the MHF of FIGS. 2A-2F.

As shown in FIGS. 6(*a*)-6(*b*), the aluminum enters the devolatilizing zone at 350° F. (see left side of FIG. 6(*a*), "SOLIDS IN FROM HEATING"), where it is heated by the 1,216° F. gases in from the decharring zone (see left side of FIG. 6(*a*), "GAS IN FROM DECHAR"), and the combustion of the volatiles from the heated aluminum feed at a rate of 1,098 lb/hr (see left side of FIG. 6(*a*), "SOLIDS IN FROM HEATING"). In the subsequent zone, the decharring zone represented in FIGS. 6(*a*)-6(*b*), excess air is injected in order to keep the aluminum cooled to a point below its melting point. The amount of excess air is limited to the total amount of air required in the devolatilizing zone. If additional cooling is required, due to a larger than normal amount of fixed carbons, water is injected in the form of a very fine spray. Optionally, cooling may be provided by steam injection. This excess air travels up to the devolatilizing zone, and is combined with any additional air needed to provide the stoichiometric amount of $O_2$ required to provide enough heat to evaporate and combust about 343 lb/hr of the 1,098 lb/hr of volatiles available in this zone. Once the aluminum reaches about 425° F., the volatiles begin to evaporate. When the aluminum reaches about 700° F., the remaining volatiles evaporate more rapidly, resulting in all of the volatile material being evaporated from the aluminum solids exiting the devolatilizing zone at about 850° F. After the desired amount of volatiles have been burned, the remainder of the evaporated volatiles will exit the devolatilizing zone at about 1,400° F., as shown at the top of FIG. 6(*a*).

The aluminum enters the decharring zone at 850° F. (see left side of FIG. 7(*a*), "SOLIDS IN FROM DEVOL"), after all of the volatiles having been evaporated off (note "SOLIDS IN FROM DEVOL" entry of "Volatiles" in FIG. 7(*a*) is 0 lb/hr). The remaining solid material, comprised of aluminum, fixed carbons and ash, continues to be heated by combustion of the fixed carbons using the air (see, e.g., FIG. 7(*a*), "Ambient Air In") that is injected into this zone. As previously mentioned, excess oxygen is injected in order to keep the material below about 900° F. when it exits the furnace (see output at bottom of FIG. 7(*a*)). Because there is excess oxygen in this zone only, fine control of the amount of injected air will be dependent on temperature, not on stoichiometric requirements. The upper limit of excess air injected will be governed by the maximum amount of air required in the devolatilizing zone, and by process considerations specific to the particular characteristics of the feedstock being recycled. If the maximum excess air is insufficient to keep the aluminum at an acceptable temperature, water sprays will provide the necessary cooling. The result of the reaction of the air and the fixed carbons is $CO_2$ gas, which travels upwardly, and exhausts with the volatile material, while clean aluminum exits from the discharge port at the bottom of the furnace.

In general, regarding process temperatures, the process limiting temperatures are bounded at the lower end by the boiling point of water (i.e., the material must reach at least near to the boiling point of water to evaporate all of the moisture) and are bounded at the upper end by the solidus temperature of the aluminum alloy(s) being processed (i.e., the temperature above which melting of the aluminum alloy(s) begin(s)) to avoid melting of any of the aluminum in the furnace.

Figure 27:
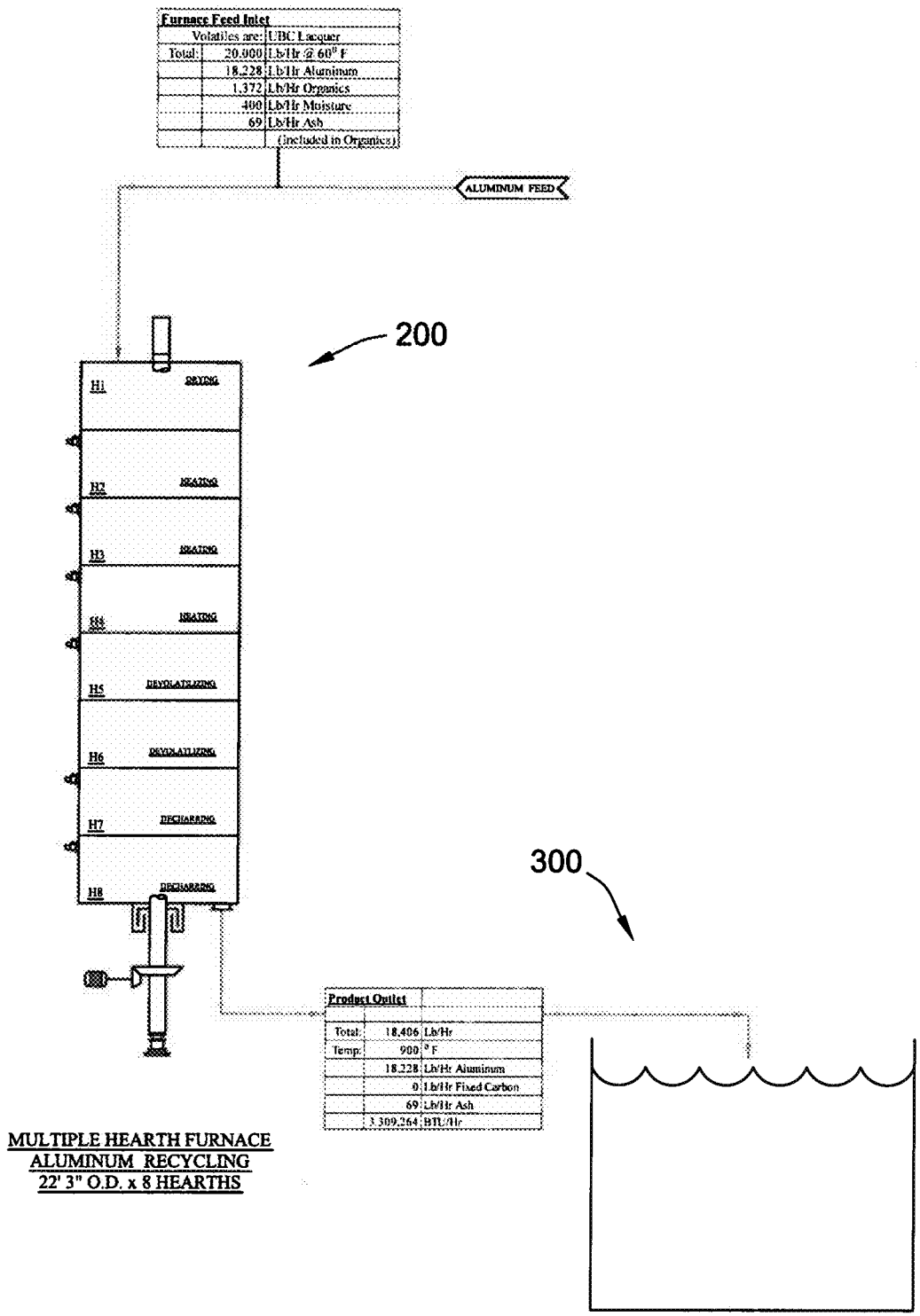
FIG. 27 shows a recycling process in accord with at least some aspects of the present concepts showing inputs and outputs of the MHF, as well as utilization of the output of the MHF in a post-processing system such as, but not limited to, an aluminum melting furnace.

As one of the many advantages realized by the present concepts, the dross generated from a melting process using the output material treated with this invention is reduced by an estimated 50 percent or greater. This significantly reduces the total amount of energy required to process secondary aluminum, as breaking down of the $Al_2O_3$ dross to recover the aluminum trapped within the oxide morphology is a highly energy-intensive process requiring extreme thermal cycles. During this post-processing, a significant amount of aluminum is lost (vaporized). One example of post-processing of the de-coated aluminum scrap is depicted in FIG. 27, wherein the product outlet of the multiple hearth furnace 200 (e.g., from a 22'3" OD, 8 hearth furnace, 8,228 lb/hr of aluminum with 69 lb/hr of ash, together at a temperature of about 900° F., is directed to an aluminum melting furnace 300). In the example of FIG. 27, H1 is a drying zone furnace, H2-H4 are heating zone furnaces, H5-H6 are de-volatizing zone furnaces, and H7-H8 are de-charring zone furnaces. In this example, the aluminum feed to the multiple hearth furnace comprises 20,000 lb/hr of aluminum-containing scrap at about 60° F., of which scrap, 18,228 lb/hr is aluminum, 1,372 lb/hr are organics, 400 lb/hr is moisture.

In accord with the present concepts, the multiple hearth furnace affords the flexibility to de-coat any type of scrap aluminum within one piece of equipment, including highly volatile scrap that is currently landfilled, and increase the recovery rate compared to conventional methods. Process parameters such as retention time, temperature, and oxygen level can be changed in order to optimize the de-coating process. The expected fuel usage is minimal due to the specific operating environment.

The foregoing disclosure has been presented for purposes of illustration and description. The foregoing description is not intended to limit the present concepts to the forms, features, configurations, modules, or applications described herein by way of example. Other non-enumerated configurations, combinations, and/or sub-combinations of such forms, features, configurations, modules, and/or applications are considered to lie within the scope of the disclosed concepts.

What is claimed:

1. A method for recycling aluminum-containing scrap comprising at least one coating material and comprising organic compounds, the method comprising the acts of:
    inputting the aluminum-containing scrap into a multiple hearth furnace comprising a plurality of hearths, the plurality of hearths collectively defining, sequentially, a drying zone, a heating zone, a de-volatizing zone, and a de-charring zone, with each of the drying zone, heating zone, de-volatizing zone, and de-charring zone comprising one or more hearths and with each of the plurality of hearths comprising at least one agitation device to move the aluminum-containing scrap within the hearth and to a successive hearth;
    maintaining a temperature of the one or more hearths comprising the drying zone between about 500° F.-1100° F. and agitating the aluminum-containing scrap within the drying zone;
    maintaining a temperature of the one or more hearths comprising the heating zone between about 900° F.-1400° F. and agitating the aluminum-containing scrap within the heating zone;
    maintaining a temperature of the one or more hearths comprising the de-volatilizing zone between about 900° F.-1600° F. and agitating the aluminum-containing scrap within the de-volatilizing zone;
    maintaining a temperature of the one or more hearths comprising the de-charring zone between about 700° F.-1250° F. and agitating the aluminum-containing scrap within the de-charring zone; and
    outputting a de-coated aluminum-containing scrap from the multiple hearth furnace to a post-processing system adapted to further process the de-coated aluminum-containing scrap,
    wherein a temperature of the aluminum-containing scrap in the multiple hearth furnace is maintained below about 1100° F. to avoid melting of the aluminum.

2. The method of claim 1, wherein the post-processing system comprises an aluminum melting furnace.

3. The method of claim 1, wherein at least one of the drying zone, heating zone, de-volatizing zone or de-charring zone comprises a plurality of hearths, each hearth in these plurality of hearths constituting a separate sub-zone within the respective zone.

4. The method of claim 3, wherein each sub-zone is maintained under different temperatures than others of the sub-zones.

5. The method of claim 1, wherein a plurality of zones selected from the group of the drying zone, heating zone, de-volatizing zone and de-charring zone comprise a plurality of hearths, each hearth in these plurality of hearths constituting a separate sub-zone within the respective zone.

6. The method of claim 1, wherein the plurality of hearths are stacked vertically relatively to one another, and wherein the plurality of hearths are disposed to alternate between in-hearths and out-hearths.

7. The method of claim 1, wherein the aluminum-containing scrap comprises aluminum laminated containers.

8. The method of claim 7, wherein the aluminum laminated containers comprise pouches and box beverage containers.

9. The method of claim 7, wherein the aluminum laminated containers comprise laminated foil.

10. The method of claim 1, wherein a recovery of aluminum is expected to be at least 82% by weight.

11. The method of claim 1, wherein the de-coated aluminum-containing scrap output from the multiple hearth furnace has at least substantially zero surface oxidation.

12. The method of claim 1, wherein each of the plurality of hearths in the multiple hearth furnace are maintained at a slightly negative pressure.

13. The method of claim 1, wherein for at least one of the plurality of hearths, one or more seals, access hatches, steel shell joints, roof joints, or floor joints of the at least one of the plurality of hearths are sealed to prevent ingress of oxygen into the hearth.

14. The method of claim 1, wherein each of the plurality of hearths is at least substantially sealed to prevent ingress of oxygen into the hearth.

* * * * *